United States Patent
Ronkainen et al.

(10) Patent No.: US 11,902,842 B2
(45) Date of Patent: Feb. 13, 2024

(54) CONTROL OF TRANSMISSION OF MOBILITY REFERENCE SIGNALS

(71) Applicant: Telefonaktiebolaget LM Ericsson (publ), Stockholm (SE)

(72) Inventors: Henrik Ronkainen, Södra Sandby (SE); Christer Östberg, Staffanstorp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 840 days.

(21) Appl. No.: 16/335,787

(22) PCT Filed: Sep. 30, 2016

(86) PCT No.: PCT/EP2016/073464
§ 371 (c)(1),
(2) Date: Mar. 22, 2019

(87) PCT Pub. No.: WO2018/059711
PCT Pub. Date: Apr. 5, 2018

(65) Prior Publication Data
US 2019/0246322 A1   Aug. 8, 2019

(51) Int. Cl.
*H04W 36/00* (2009.01)
*H04W 36/06* (2009.01)
(Continued)

(52) U.S. Cl.
CPC ....... *H04W 36/0072* (2013.01); *H04L 5/0048* (2013.01); *H04W 36/0085* (2018.08);
(Continued)

(58) Field of Classification Search
CPC ............. H04W 36/0072; H04W 36/06; H04W 36/0085; H04W 36/30; H04W 36/36; H04L 5/0048
See application file for complete search history.

(56) References Cited

U.S. PATENT DOCUMENTS 9,154,967 B2 * 10/2015 Seol ...................... H04W 16/28
9,450,661 B2    9/2016 Yu et al.
(Continued)

FOREIGN PATENT DOCUMENTS

CN   103875190 A   6/2014
CN   103875271 A   6/2014
(Continued)

OTHER PUBLICATIONS

Ericsson, "RRM requirements for New Radio Access Technology", 3GPP TSG-RAN WG4 Meeting #78bis, San Jose del Cabo, Mexico, Apr. 11, 2016, pp. 1-5, R4-161726, 3GPP.
(Continued)

*Primary Examiner* — Edan Orgad
*Assistant Examiner* — Malick A Sohrab
(74) *Attorney, Agent, or Firm* — COATS & BENNETT, PLLC

(57) ABSTRACT

A first access node obtains (601) an identity of a plurality of MRSs associated with the first access node, determines (602) an identity of a second mobility beam associated with a second access node, which second mobility beam is a neighbour mobility beam to a first mobility beam associated with the first access node, wherein the identity of the second mobility beam is determined based on a neighbour relation between the second mobility beam and the first mobility beam, and controls the transmission of MRSs by transmitting (605), to the second access node, a request to transmit a reference signal for mobility comprised in the plurality of MRSs, on the second mobility beam, and wherein the request comprises: a respective identity of one or more MRSs comprised in the plurality of MRSs, which respective identity is based on the identity of the plurality of MRSs, and the identity of the second mobility beam.

12 Claims, 19 Drawing Sheets

(51) Int. Cl.
  *H04L 5/00* (2006.01)
  *H04W 36/30* (2009.01)
  *H04W 36/36* (2009.01)

(52) U.S. Cl.
  CPC .......... *H04W 36/06* (2013.01); *H04W 36/30* (2013.01); *H04W 36/36* (2013.01)

(56) References Cited

U.S. PATENT DOCUMENTS

| | | | |
|---|---|---|---|
| 9,923,615 B2 | 3/2018 | Byun et al. | |
| 9,923,616 B2 | 3/2018 | Byun et al. | |
| 2009/0168730 A1* | 7/2009 | Baum | H04L 5/0091 370/336 |
| 2013/0272263 A1* | 10/2013 | Pi | H04L 25/0204 370/330 |
| 2014/0073337 A1* | 3/2014 | Hong | H04W 72/046 455/452.1 |
| 2015/0257073 A1 | 9/2015 | Park et al. | |
| 2016/0337916 A1* | 11/2016 | Deenoo | H04W 8/22 |

FOREIGN PATENT DOCUMENTS

| | | |
|---|---|---|
| EP | 3024273 A1 | 5/2016 |
| WO | 2015109153 A1 | 7/2015 |
| WO | 2016003336 A1 | 1/2016 |
| WO | 2016013698 A1 | 1/2016 |
| WO | 2016055102 A1 | 4/2016 |
| WO | 2016070706 A1 | 5/2016 |
| WO | 2016072886 A1 | 5/2016 |
| WO | 2016095984 A1 | 6/2016 |
| WO | 2016157059 A1 | 10/2016 |

OTHER PUBLICATIONS

Ericsson, "Initial Considerations on system access in NR", 3GPP TSG RAN WG1 Meeting #84, Busan, South Korea, Apr. 11, 2016, pp. 1-3, R1-163237, 3GPP.

Ericsson, "RRM measurements and mobility control in RRC Connected", 3GPP TSG-RAN WG2 #94, Gothenburg, Sweden, May 22, 2016, pp. 1-3, Tdoc R2-165540, 3GPP.

Samsung, NR mobility in connected-active mode, 3GPP TSG RAN WG1 #86bis, Lisbon, Portugal, Oct. 10-14, 2016, R1-1609121.

* cited by examiner

CONTROL OF TRANSMISSION OF MOBILITY REFERENCE SIGNALS

TECHNICAL FIELD

Embodiments herein relate to a first access node, a second access node, a wireless communication device, and methods therein. In particular they relate to transmission and reception of reference signals for mobility of a wireless communication device in a wireless communications network.

BACKGROUND

Wireless communication devices such as terminals are also known as e.g. User Equipments (UE), mobile terminals, wireless terminals and/or mobile stations. These terms will be used interchangeably hereafter.

Wireless communication devices are enabled to communicate wirelessly in a wireless or cellular communications network or a wireless communication system, sometimes also referred to as a cellular radio system or a cellular network. The communication may be performed e.g. between two wireless communication devices, between a wireless communication device and a regular telephone and/or between a wireless communication device and a server via a Radio Access Network (RAN) and possibly one or more core networks, comprised within the cellular communications network.

Access nodes, such as base stations, communicate over the air interface operating on radio frequencies with the wireless communication devices within range of the base stations. In the context of this disclosure, the expression Downlink (DL) is used for the transmission path from the base station to the wireless communication devices. The expression Uplink (UL) is used for the transmission path in the opposite direction i.e. from the wireless communication devices to the base station.

Further, each base station may support one or several communication technologies. Examples of wireless communications networks are Long Term Evolution (LTE), Universal Mobile Telecommunications System (UMTS) and Global System for Mobile communications (GSM).

Mobility

Mobility is a central aspect of many wireless communications networks. The wireless communication network supports mobility of a wireless communication device, i.e. service continuity of the wireless communications device, e.g. by transferring a connection between the wireless communications network and the wireless communications device from one cell to another cell or from one base station to another base station.

Handover

Handover is an important aspect of any wireless communications network. With the handover the wireless communications network tries to assure service continuity of a UE by transferring a connection between the wireless communications network and the UE from one cell to another cell and/or from one access node to another access node, depending on the technology used. FIG. 1 illustrates a schematic handover in a prior art wireless communications network 101. The wireless communications network 101 comprises access nodes, such as a first base station 111 and a second base station 112. In FIG. 1 a wireless communications device 140 moves away from the coverage of the first base station 111 and into the coverage of the second base station 112. In this scenario a handover of the wireless communications device 140 may be triggered if the wireless communications device 140 experiences a low performance of a radio link to the first base station 111. For example, the wireless communications device 140 may trigger a handover event if it finds a new cell better than it's current. Thus, a comparison may be made. The network may then decide if handover shall be done or not.

When and to what cell and/or access node a handover occurs depends on several factors such as signal strength of reference signals, load conditions in the cells, service requirements of the UE, etc. The provision of efficient/effective handovers (minimum number of unnecessary handovers, minimum number of handover failures, minimum handover delay, etc.), would affect not only the QoS of the end user but also the overall capacity and performance of the wireless communications network.

Handover in Existing Technology (Standardized in 4G/LTE)

In LTE, handover controlled by the wireless communications network and assisted by the UE is utilized, for example as described by 3GPP TS 36.300. The handover is based on UE reports, as described in more detail below. The UE is moved, if required and if possible, to the most appropriate cell that assures service continuity and quality.

Further details of a handover process in LTE, wherein the UE is in a connected mode, will now be described. This handover process consists of a number of activities such as:
  Measurements performed by the UE on consistently broadcasted reference signals, such as Cell specific Reference Signals (CRSs), from the serving and neighbouring cells. The CRSs are used to provide measurement reports to the network in connected mode. The CRSs may also be used by the UE to measure radio quality on candidate cells in order to provide cell reselection in idle mode.
  When the UE is active in connected mode it sends measurement reports to an access node, such as an eNB, e.g. triggered by decreased quality of current connection and increased quality on candidate cells.
  Measurement evaluation in the access node.
  Triggering a handover from one access node to another. The triggering is performed by the UE.

With regards to prior art wireless communications networks, e.g. based on LTE, network energy consumption and network load may still be improved. For example, consistently broadcasted reference signals used for handover contributes significantly to the energy consumption and the load of the network.

Further, there is also room for improvements related to delays related to the handover.

5G (5th generation mobile networks or 5th generation wireless systems) denotes the proposed next major phase of mobile telecommunications standards beyond the current 4G/International Mobile Telecommunications-Advanced standards.

One key design principle currently under consideration for 5G wireless communications networks is to base them on an ultra-lean design. This implies an ambition to avoid "always on signals", i.e. consistently broadcasted, from the network as much as possible.

Beamforming

In order to overcome a coverage loss that occurs when a carrier frequency increases for 5G systems, arrays of antenna elements may be introduced. This also gives a possibility to beam-form a radio signal in certain spatial directions, or radio beams. That is, a radio beam is a radio signal transmitted in a certain direction and with a certain width. In the following, the expression beam will be used interchangeably with the expression radio beam.

With the combination of several possible predefined beam directions and the possibility for an access node to simultaneously linearly combine several of the predefined beam directions, both in the UL and in the DL, it is possible to handle a large set of spatial directions. In a system where the access nodes use beam forming and a wireless communications device, such as a UE, moves around and when the surrounding potentially changes, the selection of which predefined beams to use and how to linearly combine them continuously need to be updated.

In case the wireless communications network make use of Time Division Duplex (TDD) the access node may evaluate which beam directions that is best to use in the UL and due to reciprocity, also use the same beam directions and linear combination in the DL. The wireless communications device will then see the resulting combination of beams instead of different beam directions. Hence, even though several beams are transmitted and received, virtually this is perceived as one beam which from a general perspective may be viewed as the system creates and maintains a dynamic narrow radio beam for the radio link between the access node and the wireless communications device. This radio beam may also defined as the link beam.

In Frequency Division Duplex (FDD), the above reciprocity principle may not be used as UL and DL are sent on different frequency bands. So, in FDD the beams are created based on feedback information from the other party which has measured the channel. E.g. the wireless communications device 140 may measure a channel in DL and may then report feedback info to the access node 111. The feedback is used by the access node 111 to create the link beam. Thus, there is a need for a constant feedback loop.

Mobility Beam and Mobility Reference Signals

In deployments with large antenna arrays and many possible candidate beam configurations, it is not efficient to let all beams transmit reference and measurement signals in an always-on, static manner for the sake of mobility measurements. Instead, connected access nodes may select a relevant set of "mobility beams" to transmit reference and measurement signals when required. Each mobility beam may have a certain static (fixed) direction and angle, wider compared to the link beam but far more narrow compared to an LTE cell transmitted from a sector antenna.

The mobility beam may carry, at least within the vicinity of neighbouring beams and during a limited time, a unique reference signal for mobility, e.g. for handover. The reference signal may also be referred to as a Mobility Reference Signal (MRS). In the following description MRS will be used interchangeably with the term reference signal for mobility. The wireless communications device may then be instructed to measure on each MRS and report measurements to the system. Based on some criteria, for example difference between MRS signal strength between two mobility beams, a handover may be triggered.

An example of a wireless communications network using mobility beams and MRSs is disclosed in prior art WO2016095984 A1.

A problem associated with MRSs is to coordinate usage of MRSs between the different nodes in the network. The reason is that the number of unique MRSs may be small, since many MRSs implies that the wireless communications device 140 would have to try out a lot of MRSs when it performs MRS detection which will consume a lot of processing power and time. However, the number of mobility beams in a network may be very high, which implies that a unique MRS may not be allocated to each mobility beam.

As there may be no fix allocation between MRS and beam, a specific beam may at a certain point in time transmit MRS X and later, the same beam may transmit MRS Y. Thus, there is a need to communicate MRS information to the wireless communications device when it has to evaluate quality of mobility beams.

The wireless communications device may evaluate MRSs from alternative access nodes to which it may handover its connection/radio link whenever it experiences bad quality on its radio link to a serving access node.

As the link quality may suffer from a very rapid and drastic degradation, it's crucial that the evaluation of potential handover candidates is fast. The degraded link performance also increases the risk of lost messages and due to this, it's also important to minimize the signaling between the wireless communications device and the access nodes and between the access nodes.

SUMMARY

Thus, a dynamic usage of MRSs and coordination of MRSs may require a fairly high amount of signaling during a critical phase when the quality of the radio link is bad. This may delay the overall handover procedure or even cause a dropped connection due to lost messages in the communication between the wireless communications device and the network nodes.

An object of embodiments herein is to improve the performance of one or more wireless communications networks comprising access nodes and of a wireless communications device by obviating at least some of the above mentioned problems. It may be an object of embodiments herein to reduce the energy consumption and the load of a wireless communications network. It may further be an object of embodiments herein to reduce delays related to the handover.

According to a first aspect of embodiments herein it is provided a method performed by a first access node for controlling transmission of reference signals for mobility carried by beams for mobility in a wireless communications network.

The first access node obtained an identity of a plurality of reference signals for mobility associated with the first access node.

The first access node further determines an identity of a second beam for mobility associated with a second access node, which second beam for mobility is a neighbour beam for mobility to a first beam for mobility associated with the first access node, wherein the identity of the second beam for mobility is determined based on a neighbour relation between the second beam for mobility and the first beam for mobility.

The first access node further controls the transmission of reference signals for mobility by transmitting, to the second access node, a request to transmit a reference signal for mobility comprised in the plurality of reference signals for mobility, on the second beam for mobility.

The Request Comprises:
  a respective identity of one or more reference signals for mobility comprised in the plurality of reference signals for mobility, which respective identity is based on the identity of the plurality of reference signals for mobility, and
  the identity of the second beam for mobility.

According to a further aspect of embodiments herein it is provided a first access node adapted to operate in a wireless communications network.

The first access node is adapted to obtain an identity of a plurality of reference signals for mobility associated with the first access node, and to
obtain an identity of a plurality of reference signals for mobility associated with the first access node.

The first access node is further adapted to determine an identity of a second beam for mobility associated with a second access node, which second beam for mobility is a neighbour beam for mobility to a first beam for mobility associated with the first access node, wherein the identity of the second beam for mobility is determined based on a neighbour relation between the second beam for mobility and the first beam for mobility.

The first access node is further adapted to control the transmission of reference signals for mobility by transmitting, to the second access node, a request to transmit a reference signal for mobility comprised in the plurality of reference signals for mobility, on the second beam for mobility, and wherein the request comprises:
a respective identity of one or more reference signals for mobility comprised in the plurality of reference signals for mobility, which respective identity is based on the identity of the plurality of reference signals for mobility, and
the identity of the second beam for mobility.

According to a further aspect of embodiments herein it is provided a method performed by a second access node for controlling transmission of reference signals for mobility carried by beams for mobility in a wireless communications network.

The second access node receives, from a first access node a request to transmit a reference signal for mobility associated with the first access node, on a second beam for mobility associated with the second access node. The request comprises:
a respective identity of one or more reference signals for mobility, and
an identity of the second beam for mobility.

The second access node further determines, based on the received respective identity of the one or more reference signals for mobility, the reference signal for mobility for transmission on the second beam for mobility, and
transmits the determined MRS on the second beam for mobility.

According to a further aspect of embodiments herein it is provided a second access node adapted to operate in a wireless communications network. The second access node is adapted to receive, from a first access node a request to transmit a reference signal for mobility associated with the first access node, on a second beam for mobility associated with the second access node, which request comprises:
a respective identity of one or more reference signals for mobility associated with the first access node, and
an identity of the second beam for mobility.

The second access node is further adapted to determine, based on the received respective identity of the one or more reference signals for mobility, the reference signal for mobility for transmission on the second beam for mobility.

The second access node is further adapted to transmit the determined MRS on the second beam for mobility.

According to a further aspect of embodiments herein it is provided a method performed by a wireless communications device for receiving Mobility Reference Signals, reference signals for mobility, carried by beams for mobility in a wireless communications network.

The wireless communication device receives from a first access node, an identity of a plurality of reference signals for mobility associated with the first access node.

The wireless communication device schedules, based on a relation between the identity of the plurality of reference signals for mobility and respective identities of individual reference signals for mobility comprised in the plurality of reference signals for mobility, detection and measurements of respective individual reference signals for mobility, comprised in the plurality of reference signals for mobility.

The wireless communication device receives a reference signal for mobility out of the plurality of reference signals for mobility, which MRS is received on a beam for mobility associated with the second access node.

According to a further aspect of embodiments herein it is provided a wireless communications device adapted to operate in a wireless communications network. The wireless communication device is adapted to receive, e.g. from the first access node, an identity of a plurality of reference signals for mobility associated with the first access node.

The wireless communication device is further adapted to schedule, based on a relation between the identity of the plurality of reference signals for mobility and respective identities of individual reference signals for mobility comprised in the plurality of reference signals for mobility, detection and measurements of respective individual reference signals for mobility, comprised in the plurality of reference signals for mobility.

The wireless communication device is further adapted to receive a reference signal for mobility out of the plurality of reference signals for mobility, which MRS is received on a beam for mobility associated with the second access node.

According to a further aspect of embodiments herein it is provided a computer program product comprising software instructions that, when executed in a processor performs the methods above.

The first access node transmits the request to transmit a reference signal for mobility comprised in the plurality of reference signals for mobility on the second beam for mobility to the second access node. Thereby signaling between the first and the second access nodes for the purpose of handover of the wireless communications device is reduced, which reduces the latency for the complete handover procedure. Further, signaling between the first access node and the wireless communications device, and signaling between the second access node and the wireless communications device is also reduced at node handover situations.

For example, the wireless communications device may start evaluation of candidate beams for mobility without signaling from the access nodes.

The reduced signalling has the effect of faster evaluation of candidate beams since by the wireless communications device, which improves handover performance, e.g. less number of dropped connections for the wireless communications device.

Thus the first access node is able to control the transmission of reference signals for mobility in the wireless communications network in an improved way.

An advantage of embodiments herein is that using fewer reference signals for mobility relaxes the detection task for the wireless communications device as less number of potential sequences/signatures for the reference signals for mobility has to be matched against a received reference signal for mobility.

BRIEF DESCRIPTION OF THE DRAWINGS

Examples of embodiments herein are described in more detail with reference to attached drawings in which.

DETAILED DESCRIPTION

Figure 1:
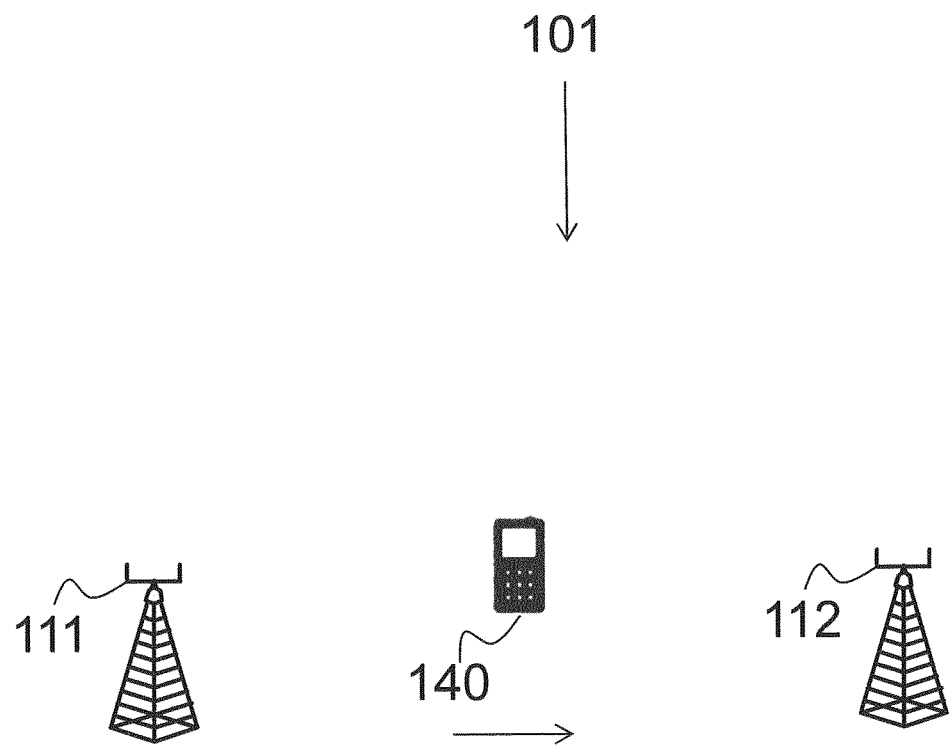
FIG. 1 is a schematic block diagram illustrating a prior art wireless communications network.
Figure 2:
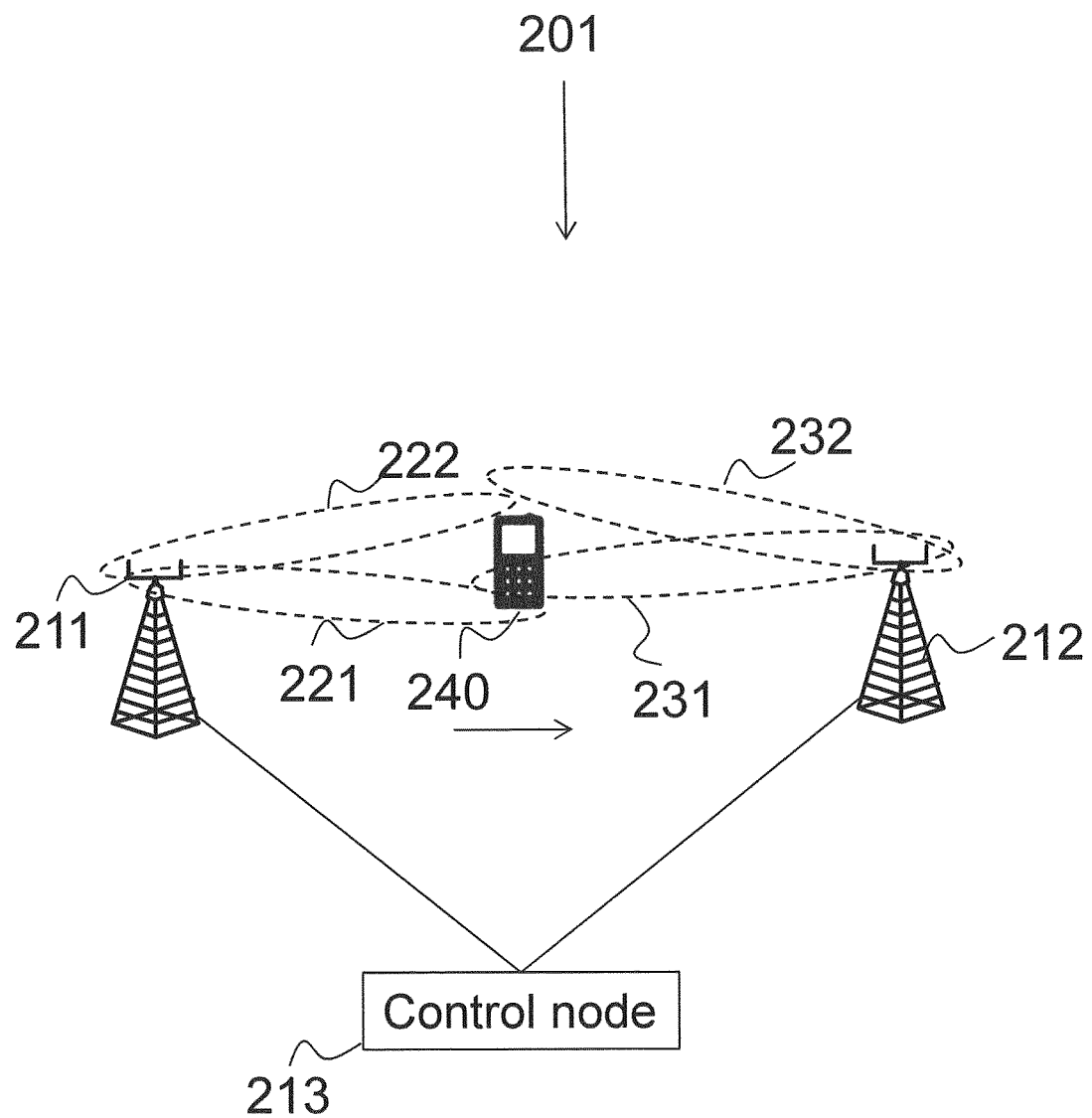
FIG. 2 is a schematic block diagram illustrating a wireless communications network.

Embodiments herein may be implemented in one or more wireless communications networks. FIG. 2 depicts parts of such a wireless communications network 201. The wireless communications network 201 may for example be a 5G/New Radio (NR), any 3GPP or any cellular wireless communications network or system that make use of reference signals transmitted on radio beams, such as mobility beams. 5G/NR will hereafter be used to exemplify the embodiments although the solution is thus not limited thereto.

The wireless communications network 201 comprises a plurality of base stations and/or other network nodes. More specifically, the wireless communications network 201 comprises a first access node 211.

The term "access node" may correspond to any type of radio network node or any network node which communicates with at least a radio network node. For example, the first access node 211 may be a base station, such as an eNB. The base station may also be referred to as a NodeB, an evolved Node B (eNB, eNode B), a base transceiver station (BTS), Access Point (AP) Base Station, Wi-Fi AP, base station router, or any other network unit capable of communicating with a wireless communication device within a coverage area served by the base station depending e.g. on the radio access technology and terminology used.

In some embodiments the wireless communications network 201 further comprises a second access node 212.

In the following scenarios related to handover, the first access node 211 will be an example of a source access node, while the second access node 212 will be an example of a target access node.

The wireless communications network 201 may further comprise a network control node 213. The network control node 213 terminates the layer 3 (L3) signalling and connects to the core network. So, instead of terminating the L3 signalling in each access node, that function may be centralized such that the network control node 213 may support many access nodes with L3 signalling support.

In embodiments herein the first access node 211 serves wireless communication devices, such as a wireless communication device 240, also referred to as a UE herein. The first access node 211 may communicate with the wireless communication device 240 over a radio link.

The wireless communication device 240 may further be e.g. a mobile terminal or a wireless terminal, a mobile phone, a computer such as e.g. a laptop, a Personal Digital Assistants (PDAs) or a tablet computer, sometimes referred to as a surf plate, with wireless capability, target device, device to device UE, Machine Type Communication UE or UE capable of machine to machine communication, iPAD, mobile terminals, smart phone, Laptop Embedded Equipment (LEE), Laptop Mounted Equipment (LME), USB dongles etc. or any other radio network units capable to communicate over a radio link in a wireless communications network.

Please note the term user equipment used in this disclosure also covers other wireless devices such as Machine to machine (M2M) devices, even though they are not operated by any user.

As mentioned above, the first and second access nodes 211, 212 may comprise arrays of antenna elements in order to overcome the coverage loss at high carrier frequencies and in order to beam-form a radio signal in certain spatial directions, or beams, i.e. radio beams.

Several possible predefined beam directions may be achieved, and the first and second access node 211, 212 may simultaneously linearly combine several of the predefined beam directions, both in the UL and in the DL. By doing so it is possible to handle a large set of spatial directions. However, the selection of which predefined beams to use and how to linearly combine them continuously need to be updated.

As mentioned above, connected access nodes, such as the first access node 211, may select a relevant set of "mobility beams" to transmit when required. Each mobility beam may have a certain static, i.e fixed, direction and angle, wider compared to the link beam but far more narrow compared to an LTE cell transmitted from a sector antenna.

Thus, as illustrated in FIG. 2, the first access node 211 may produce a plurality of beams for mobility, such as a first beam for mobility 221, 222.

Likewise, the second access node 212 may also produce a plurality of beams for mobility, such as a second beam for mobility 231, 232.

The beams for mobility may also be referred to as mobility beams in embodiments herein. E.g. the first mobility beam 221, 222 and the second mobility beam 231, 232.

The first and second beams for mobility 221, 222, 231, 232 may carry, at least within the vicinity of neighbouring beams and during a limited time, a reference signal for mobility, e.g an MRS. The reference signal for mobility may be unique. Throughout this description and in embodiments herein, these reference signals will be exemplified with MRSs.

The wireless communications device 240 may then be instructed, e.g. by the first access node 211, to measure on each MRS that it receives and report measurements related to the MRSs to the wireless communications network 201, e.g. to the first access node 211. Based on some criteria, for example a difference between MRS signal strength between two mobility beams, a handover may be triggered.

In some embodiments herein reference signals for mobility, such as MRSs, may be grouped. For example, the first access node 211 may be configured with a first plurality of MRSs that are identified with a first common, i.e shared, identity, such as a first group identity, such as an MRS group identity, sometimes referred herein as an MRS group or MRS group ID or MRS group id.

Likewise the second access node 212 may be configured with a second plurality of MRSs that are identified with a second common identity, such as a second group identity.

Below, methods for controlling transmission of reference signals for mobility carried by beams, such as mobility beams, in the wireless communications network 201 will be illustrated in more detail by a number of exemplary embodiments.

It should be noted that these embodiments are not mutually exclusive. Components from one embodiment may be tacitly assumed to be present in another embodiment and it will be obvious to a person skilled in the art how those components may be used in the other exemplary embodiments.

As mentioned above, in contrast to LTE, in the NR radio network reference signals may be sent discontinuously. For example, the MRS transmission on mobility beams may be activated on demand when needed. For mobility to work efficiently, the involved access nodes may need to maintain a mobility beam neighbour list, exchange beam information, and coordinate MRS usage as the number of MRSs are limited.

For example, in the mobility beam neighbour list presented in Table 1 below there may be, for each mobility beam in the access node, a list of neighbour mobility beams from either own node or other nodes or both. The neighbour mobility beams have some area overlap with the own mobility beam. I.e., in some locations in an overlap region the wireless communication device 240 may maintain a connection to more than one access node.

TABLE 1

| Source AN Beam | Neighbour AN | neighbour AN Beam |
|---|---|---|
| 1 | A | 5 |
| 1 | A | 4 |
| 1 | B | 10 |
| 2 | A | 4 |

The exchange beam information may be e.g. statistical information about handover success-rate. E.g., even though a beam X is neighbour to beams Y & Z, the success rate for handover between X and Z may be 100% while the success rate for handover between X and Y is 50%. Based on this the list may be updated. The exchange beam information may also be load information. For example, if there are very frequent handovers between two beams the access nodes may decide to keep certain beams active for longer periods to avoid toggling MRS on/off.

In embodiments herein the source access node, such as the first access node 211, is in control of the MRSs to be used at inter-node mobility. I.e., the source access node lends MRSs to neighbour/target access nodes, such as the second access node 212, temporarily during beam evaluation, i.e. during evaluation of radio beams. In the following description of embodiments the expression source access node and first access node will be used interchangeably. Likewise, the target access node and second access node will be used interchangeably hereafter.

In embodiments herein an access node, such as the first and second access nodes 211, 212, is assumed to have one or more antenna points from which it may transmit a number of radio beams in different directions. In the example in FIG. 3, each access node has three antenna points and the area covered by the transmission from each antenna point may be defined as a coverage area. In some embodiments herein allocation of MRSs to each system or coverage area is performed in a static or semi-static way.

Figure 3:
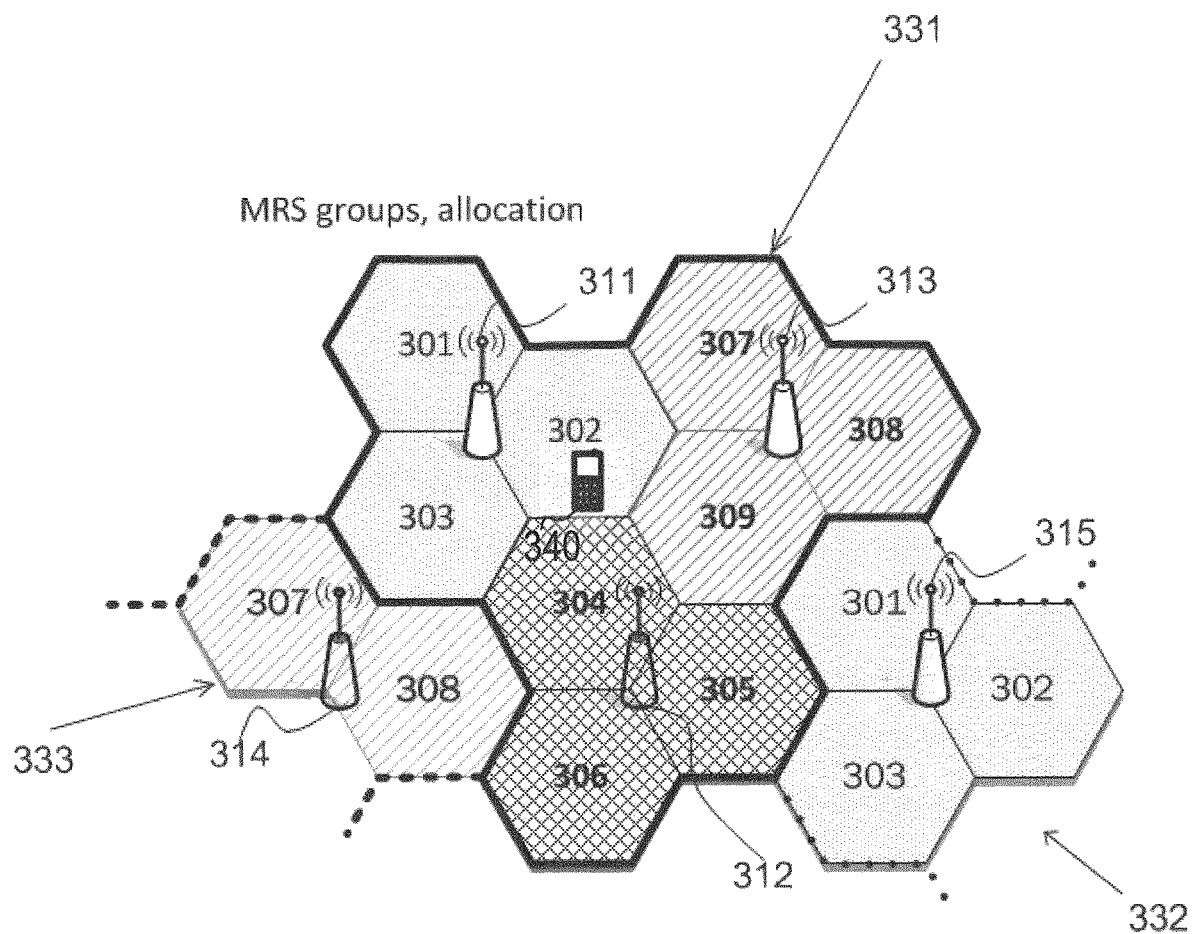
FIG. 3 is a schematic block diagram illustrating MRS group allocation.

FIG. 3 illustrates a principle for sharing of MRSs in the wireless communications network 201 according to embodiments herein. The MRSs may be distributed to a limited set of access nodes in a geographical area. In FIG. 3 the MRSs have been allocated group wise, such that there exists in total 9 sets of MRSs 301-309. In an area 331 each access node 311, 312, 313 has been allocated its own set of MRSs. For example, access node 311 has been allocated three sets of MRSs, namely 301, 302 and 303. Each set of MRSs 301-309 is unique within the area 331. Then the same set of MRSs 301-309 may be re-used in another area 332, 333 that is far away enough, not to cause conflicting MRS reception in the wireless communications device 240, 340, such as a UE. That is, the wireless communications device 240, 340 detects a specific MRS from one access node only.

With this principle it is possible to avoid that the wireless communications device 240 may detect the same MRS from two different directions/areas during the same handover measurement session due to that the same MRS groups are in adjacent or near areas. If the wireless communications device 240 detects the same MRS from two different directions/areas during the same handover measurement session, i.e. during the same measurement session related to handover, the wireless communications device 240 may disregard the worse MRS and only use the strongest MRS.

As mentioned above, the MRSs may be grouped into predefined sets or groups of MRSs. The information of grouping may be hardcoded and known in advance or may be sent in system information, either broadcasted or comprised in dedicated signaling to the wireless communications device 240 at connection setup or during the connection. In this way the information about applicable MRSs for a certain access node may be delivered in a compact way by sending a group identity instead of a complete list of MRSs. Thus resources of the wireless communications network 201 are saved.

As mentioned in the background, it's assumed that there may be a limited amount of MRSs available for the purpose of handover evaluation between different access nodes and their mobility beams. As a purely illustrative example, it may be assumed that 150 unique MRS signature sequences are available and this figure will be used further on as an example. Every unique MRS signature/sequence may be assigned a unique identity, here defined as an MRS ID numbered from 0 to max number of MRSs−1 (i.e. 0-149).

Using the allocation pattern shown in FIG. 3, there are 9 different groups of MRS IDs, or in other words 9 MRS groups. Dividing the MRSs equally between the different groups results in 16 unique MRS IDs for each group and 6 remaining MRSs. The MRS groups may then comprise MRS ID 0-15, 16-31, . . . , 128-143.

The MRS groups may be numbered from 0 . . . n and the comprised MRS IDs may be a range of contiguous identities. For example, MRS start ID=groupNo×groupSize MRS end ID=MRS start ID+groupSize-1

The MRS allocation to each access node may be done such that it enables fast frame time synchronization by the wireless communications device 240. This may be achieved by having a fixed time relation between a certain MRS identity and a start of a time frame in which the transmission of the MRS takes place. Further, the MRS identities allocated to each access node may be arranged in a manner that enables transmission of as many MRSs as possible in several beams associated with the same access node during the same subframe.

Figure 4A:
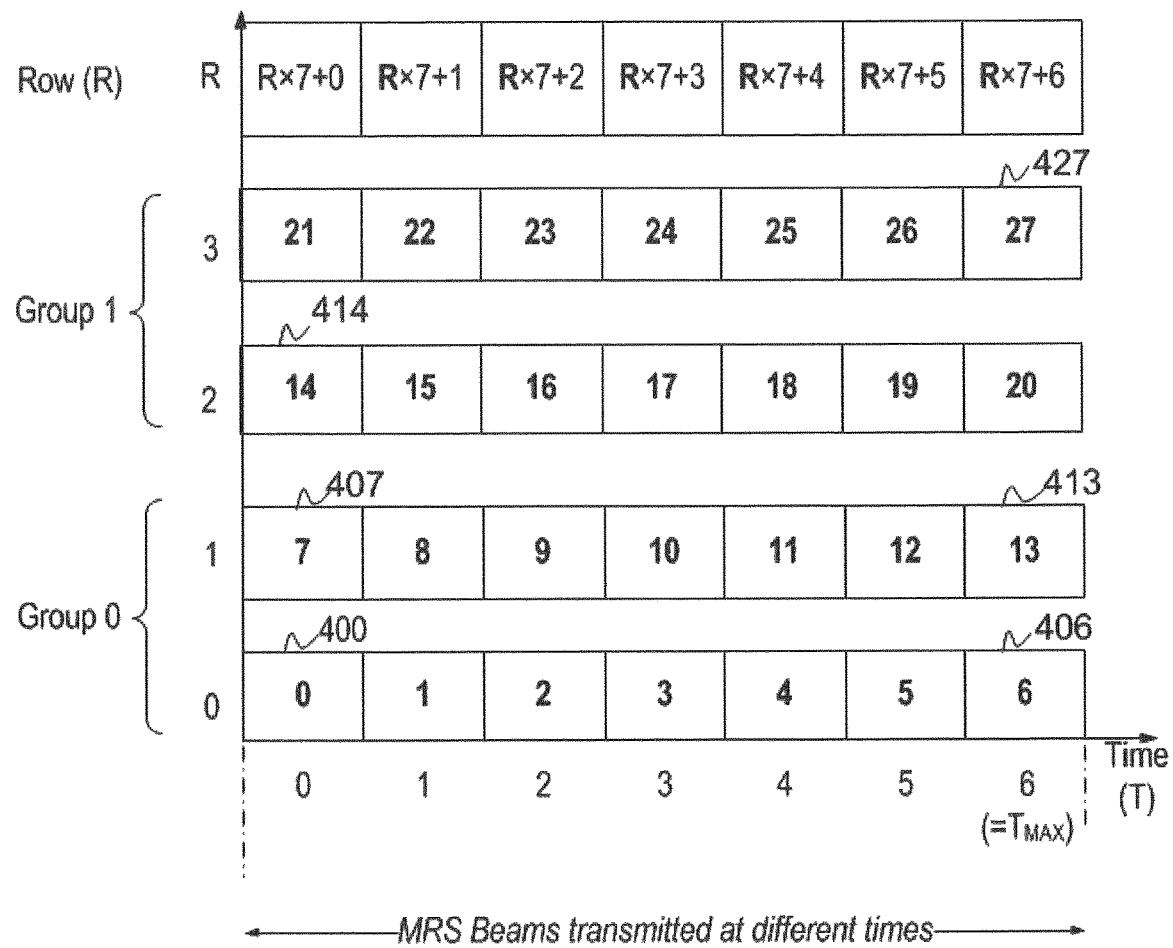
FIG. 4a is a schematic block diagram illustrating MRS allocation.

FIG. 4a shows a principle for how to identify MRS groups based on MRS timing. Instead of using one MRS group ID for row 0 and 1, a Row identifier R may be communicated between the wireless communications network 201 and the wireless communications device 240 instead. In the example in FIG. 4a, the wireless communications device 240 may be configured with two identifiers, e.g. a first identifier for Row 0 and a second identifier for Row 1, to allocate the first 14 MRS IDs, instead of only one common MRS Group ID. However, the principle is the same and the wireless communications device 240 is able to derive the MRS IDs from either the MRS group ID or from the Row identifier. For example, MRS ID may be calculated as: MRS ID=R multiplied with $(T_{max}+1)+T$, where R is the row identifier and T is the symbol time in which the MRS is transmitted. Thus in FIG. 4a, MRS 406 has MRS ID 6 and is transmitted at symbol time 6, whereas MRS 413 has MRS ID 13 and is also transmitted at symbol time 6.

Thus, in FIG. 4a there are two possible MRSs to choose from for each symbol and each MRS group, e.g. either MRS ID 2 or 9 from MRS group 0 may be transmitted in symbol 2, i.e. symbol time 2.

Figure 4B:
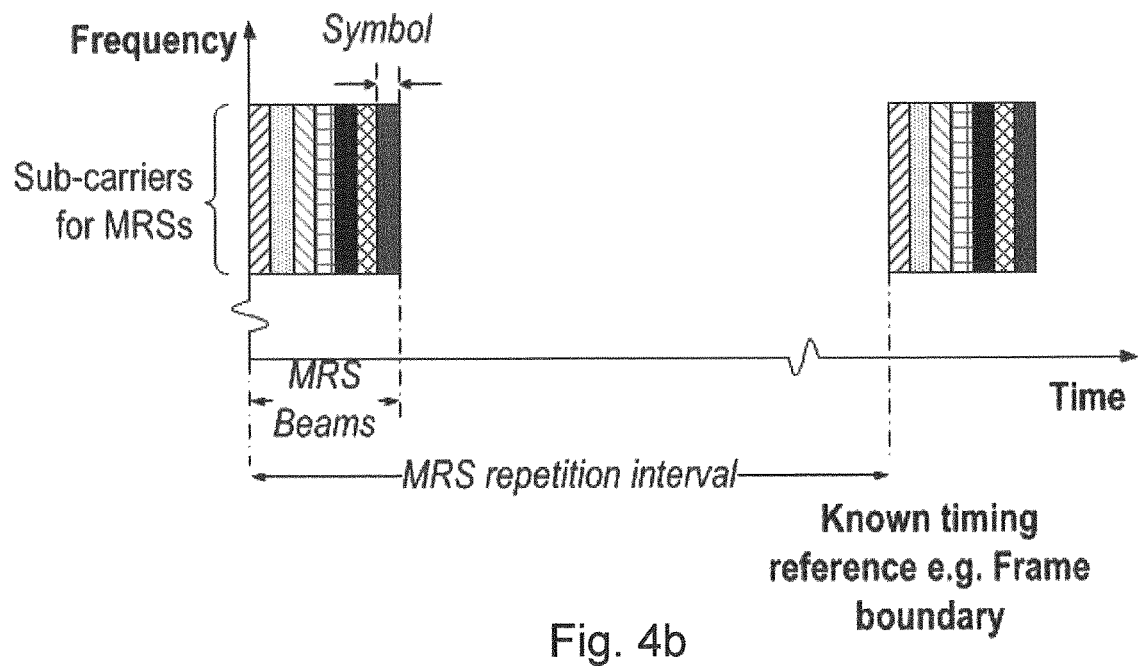
FIG. 4b is a schematic block diagram illustrating MRS allocation.

FIG. 4b illustrates an example of symbol and subframe timing of the MRSs used in embodiments herein.

In a wireless communications network operating according to Orthogonal Frequency Division Multiplexing (OFDM) technology, the MRS for a specific mobility beam may be transmitted within one OFDM symbol over a number of sub-carriers. In the following an OFDM symbol will also be referred to as a symbol. Thus, for each symbol, the access node may switch mobility beam and transmit a different MRS.

The starting point for the first MRS transmission may be placed at a known timing reference, e.g. at the first symbol after a frame boundary, but may as well be placed at a different time as long the time position is known for the wireless communication devices receiving the MRS. The number of symbols defined for MRS transmission may be limited in time. In FIG. 4b it is assumed that the duration is 7 symbols, which is the length of a subframe in the proposed 5G radio interface, but a different length is possible.

The interval between different transmissions is also known to limit the search window for MRS detection. If the interval is very long, potentially the wireless communications device 240 will have to search for a long time.

In some embodiments herein the access nodes only transmit MRSs during a short period when needed with a shorter interval during that period. As a consequence the wireless communications device 240 will need to search for a shorter time and thus will save power.

Figure 4C:
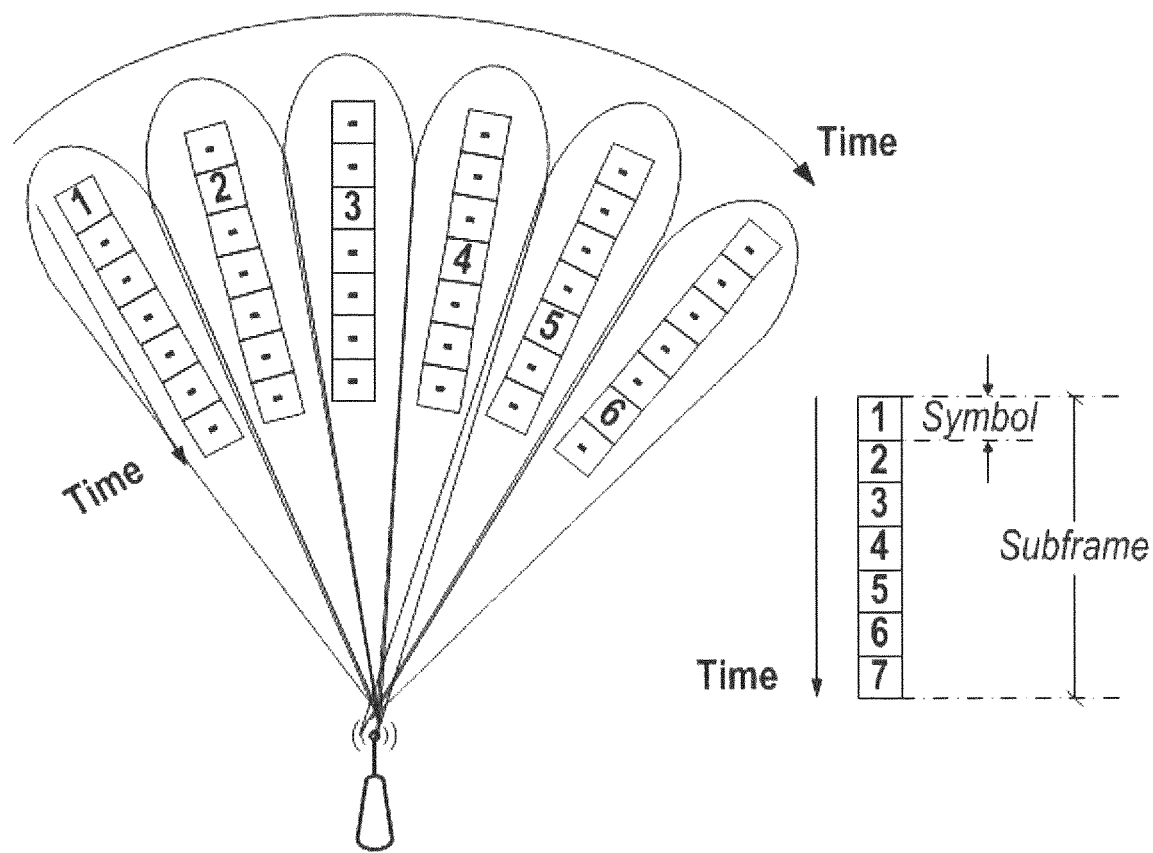
FIG. 4c is a schematic block diagram illustrating MRS allocation.

FIG. 4b illustrates 7 symbols per subframe, and MRS transmission during one subframe. Thus, within the duration of one subframe, MRSs may be transmitted in 7 different mobility beams in a time sliced way as shown in FIG. 4c. FIG. 4c illustrates a simplified example wherein one subframe comprises 7 symbols. For each symbol a new MRS is transmitted, but in another mobility beam. The order of the MRS transmission may be different.

To achieve an efficient distribution of MRSs, the MRS group size may be a multiple of the number of symbols used for MRS transmission, i.e. 7, 14, 21 . . . for the example above. Then there are 14 MRS IDs, instead of 16, in each group, and the groups comprise MRS ID 0-13, 14-27, . . . , 112-125 together with 24 extra MRS IDs (126-149).

As mentioned above, to enable efficient establishment of frame timing, some embodiments herein make use of a fix relation between MRS ID and the symbol time in which the MRS is sent. For example, symbol number [0 . . . 6]=(MRS ID−1) MOD 7, as illustrated in FIG. 4a. This means that when the wireless communications device 240 detects and identifies a specific MRS id, it may calculate the start of the corresponding frame in which the corresponding specific MRS is received.

One way to implement detection of MRSs is that the wireless communications device 240 tries out each MRS in the received MRS group against the received signal. If there is a match the wireless communications device 240 detects that there is a high power detected on the reference signal. If the power of the reference signal is above a certain threshold, the wireless communications device 240 may consider this as a match/detection.

Figure 5:
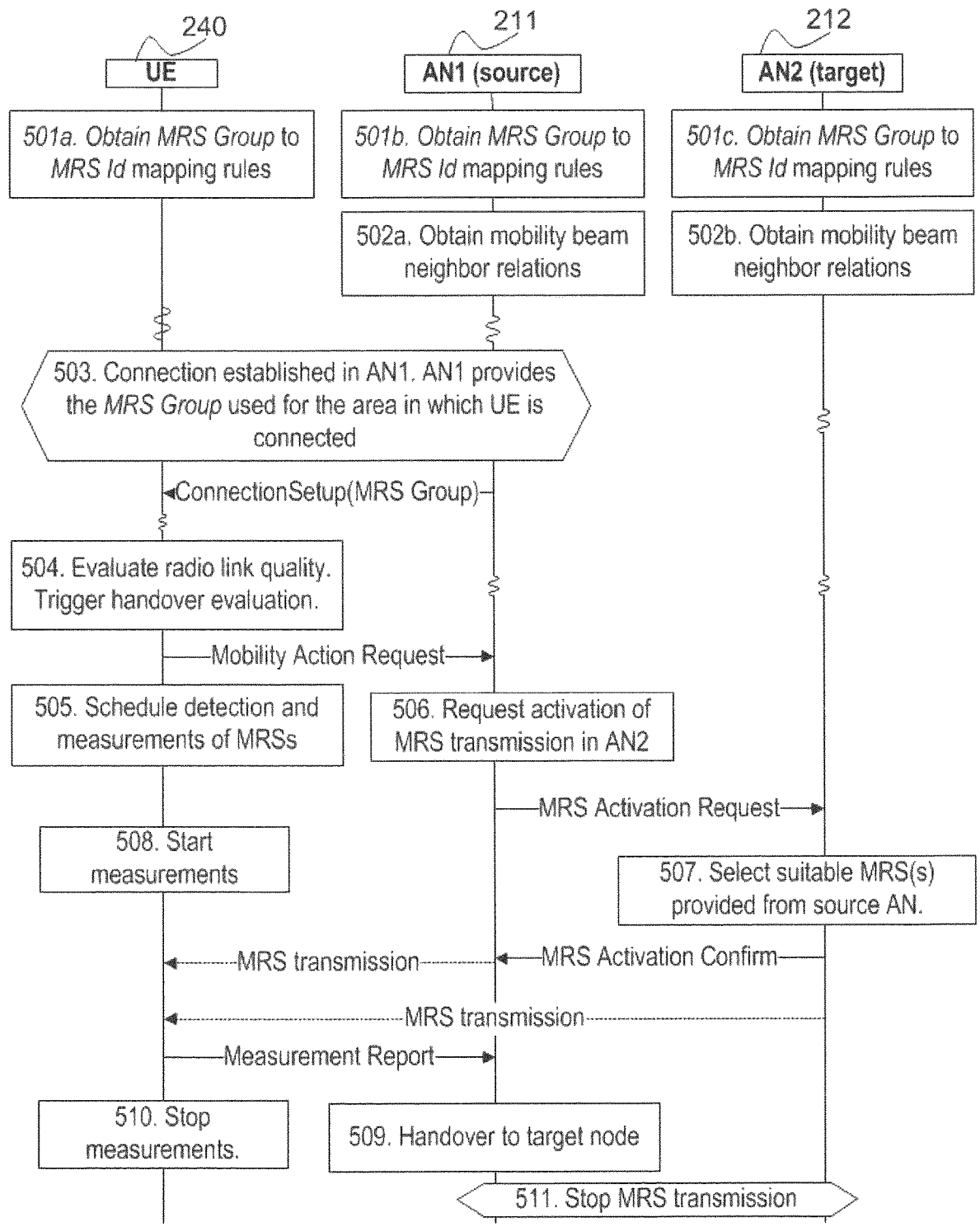
FIG. 5 is a combined flowchart and sequence diagram illustrating embodiments of a method.

Embodiments for controlling transmission of reference signals for mobility, such as MRSs, carried by radio beams for mobility in the wireless communications network 201, will firstly be described by describing the interactions of the first and second access nodes 211, 212 and the wireless communications device 240 with reference to a combined signaling diagram and flow chart illustrated in FIG. 5a and with continued reference to FIG. 2.

In an example scenario in which embodiments herein may be applied the wireless communications device 240 may be moving in a direction away from the first access node 211, which is indicated by the arrow in FIG. 2. Thus in this scenario the wireless communications device 240 is in need for handover evaluation.

Action 501a

The wireless communications device 240 knows how to derive MRS IDs from a specific MRS Group, i.e. from an identity of an MRS group. For example, the wireless communications device 240 may obtain an MRS group to MRS Id mapping from the wireless communications network 201.

Actions 501b and 501c

Likewise, the access nodes 211, 212 may obtain an MRS group to MRS Id mapping from the wireless communications network 201. For example, they may obtain the mapping from a network control node, such as a Network Management Center/node which is connected to each access node.

Actions 502a and 502b

The access nodes 211, 212 may also obtain and maintain neighbour relation information between mobility beams.

This action is related to action 602 below.

Action 503

In some embodiments the wireless communications device 240 may be informed about the MRS Group(s) used in an area or subarea, such as a coverage area, controlled by the source access node 211, when a connection between the wireless communications device 240 and the source access node 211 is established. The wireless communications device 240 may further be informed or configured about thresholds related to radio link/channel quality to trigger mobility evaluations.

This action is related to actions 603 and 901 below.

Action 504

During the lifetime of the connection, the wireless communications device 240 supervises the quality of the connection. When the quality is degraded below the configured or predefined thresholds related to radio link/channel quality to trigger mobility evaluations, it signals this to the source access node 211, e.g in a Mobility Action Request.

This action is related to actions 604 and 902 below.

Action 505

The wireless communications device 240 also prepares MRS detection and measurements of MRSs derived from the configured MRS Group without any specific signalling as it is aware of the potential MRSs to be found.

This action is related to action 903 below.

Action 506

Based on neighbour relation information, the source access node 211 identifies potential candidate mobility beams associated with the target access node 212 to which the wireless communications device 240 may perform handover.

The source AN requests potential target nodes to start MRS transmission in candidate mobility beams. The request signal comprises a list of MRSs associated with the source AN together with a list of identified potential candidate mobility beams in the target node.

Either the source access node 211 configures the target access node 212 with an explicit MRS Id to be used for a target beam, or it may send a prioritized list of MRS Ids for the target access node 212 to choose from. This may be advantageous if a specific symbol is occupied by another MRS as may be seen from FIG. 4a several MRSs share one symbol. Then the target access node 212 replies with the selected MRS Id for each mobility beam. In case of symbol time collision, the target access node 212 may stop ongoing MRS transmission and use the proposed MRS.

In an alternative embodiment the target access node 212 provides a list of alternative symbol times to the source access node 211. Based on the time information, the source access node 211 may select an MRS Id for the target access node 212.

The source access node 211 may also starts MRS transmission on local mobility beams, i.e. in mobility beams associated with the source access node 211.

This action is related to action 605 below.

Action 507

From the signaled data, the target access node 212 selects suitable MRSs and starts the MRS transmission on the candidate mobility beams identified by the request in action 506.

It then responds to the source node about selected configuration.

This action is related to actions 702 and 703 below.

Action 508

Some point in time after the mobility action request, the UE starts detection and measurements for the MRSs derived from the MRS Group.

This action is related to actions 903 and 904 below.

Action 509

After a measurement period, which may be predefined or configured, the wireless communications device 240 sends a measurement report with quality information for the different MRSs to the source access node 211.

Based on the measurement report, the source AN makes a handover decision. The handover decision may as well be taken in the wireless communications device 240.

Depending on measurement period, one or more measurement reports may be sent from the wireless communications device 240.

Action 510

The wireless communications device 240 may end the measurements either after a timer has expired or when a handover execution is triggered.

Action 511

As soon as relevant and/or enough measurement data is received in the source AN, it may stop MRS transmission. At this point in time it may also order a stop of MRS transmission in the target node(s). Optionally this is timer controlled.

Once the new target access node 212 has been decided, e.g. by the source access node 211, the wireless communications device 240 has to be configured with the proper MRS group valid for the new, i.e. target, access node. This may be done using higher layer signaling, such as L3 and above, but as a consequence of the compact format used for the MRS group or the identity of the MRS group, it may also be done efficiently using layer 1 and 2 signaling. This will be further explained in relation to FIG. 8a and FIG. 8b, which illustrate the principle for how the layer 1 and 2 signaling may be performed by including MRS Group information in the synchronization procedure towards the new target access node. This further reduces the signalling load and therefore further improves the performance of the wireless communications network 201.

Figure 6A:
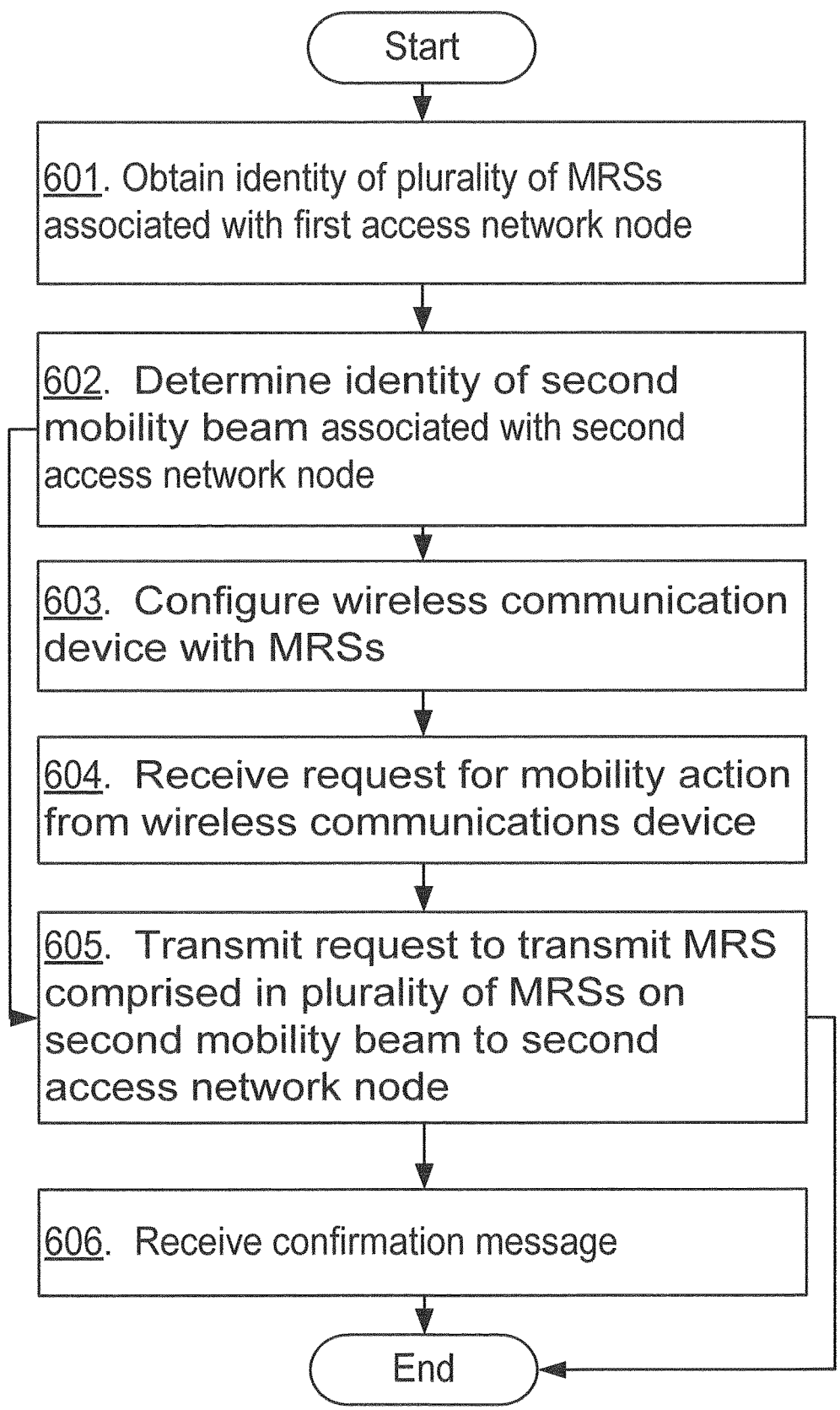
FIG. 6a is a flowchart illustrating embodiments of a method performed by a first access node.

Embodiments for controlling transmission of reference signals for mobility, carried by beams for mobility in the wireless communications network 201, will now be described from the point of view of the first access node 211 with reference to the flow chart of FIG. 6 and with continued reference to FIG. 2 and FIG. 4a.

Action 601

In order to be able to use reference signals for mobility the first access node 211 is configured in one way or another with a plurality of reference signals for mobility 400-413.

Therefore, the first access node 211 obtains an identity of the plurality of reference signals for mobility 400-413 associated with the first access node 211.

In some embodiments an identity of a reference signal for mobility is based on when in time the reference signal for mobility is transmitted. An advantage of a fixed relation between the identity of the specific MRS and when in time the specific MRS is transmitted is that the wireless communications device 240 is able to establish frame time synchronisation at handover based on a narrow mobility beam instead of using a wider beam, e.g. covering all the mobility beams from an access node, for frame time synchronisation. Using a narrow beam for frame time synchronisation increases coverage and thus, fewer access nodes are required in the wireless communications network 201. This is especially important at high carrier frequencies which suffers from worse radio propagation than lower carrier frequencies.

As explained above in relation to FIG. 3, the plurality of reference signals for mobility 400-413 may be unique within a coverage area 331 of the first access node 211, 311.

This action is related to action 501*b* above.

Action 602

As mentioned above, based on neighbour relation information, the source access node 211 identifies potential candidate mobility beams associated with the target access node.

In other words, the first access node 211 determines an identity of the second beam for mobility 231, 232 associated with the second access node 212. The determined second beam for mobility 231, 232 is a neighbour beam for mobility to the first beam for mobility 221, 222 associated with the first access node 211.

The identity of the second beam for mobility 231, 232 is determined based on a neighbour relation between the second beam for mobility 231, 232 and the first beam for mobility 221, 222.

The neighbour relation may be obtained from the wireless communications network 201 in an earlier action, e.g from the network control node 213.

This action is related to action 502*a* above.

Action 603

The first access node 211 may configure the wireless communication device 240 to receive the plurality of reference signals for mobility 400-413 by transmitting the identity of the plurality of reference signals for mobility 400-413 to the wireless communication device 240.

The wireless communications device 240 may be configured with the reference signal for mobility in a specific area such as in a coverage area or systems area of the first access node 211.

This action is related to action 503 above and action 901 below.

Action 604

The first access node 211 may further receive a request for a mobility action from the wireless communication device 240.

This action is related to action 504 above and action 902 below.

Action 605

The first access node 211 controls transmission of the reference signals for mobility by transmitting, to the second access node 212, a request to transmit a reference signal for mobility comprised in the plurality of reference signals for mobility 400-413, on the second beam for mobility 231, 232.

The Request Comprises:
  a respective identity of one or more reference signals for mobility 400-406 comprised in the plurality of reference signals for mobility 400-413, and
  the identity of the second beam for mobility 231, 232.

The respective identity is based on the identity of the plurality of reference signals for mobility 400-413.

As mentioned above individual identities of reference signals for mobility are in one way or another derivable from the identity of the plurality of reference signals for mobility 400-413. As further mentioned above there may for example be a fixed relation between an identity of an MRS group and the MRS identities of the MRSs in the MRS group.

Since the first access node 211 transmits the request to transmit an MRS comprised in the plurality of reference signals for mobility 400-413 on the second beam for mobility 231, 232 to the second access node 212 signaling between the first and the second access nodes 211, 212 for the purpose of handover of the wireless communications device 240 is reduced, which reduces the latency for the complete handover procedure.

Further, signaling between the first access node and the wireless communications device, and signaling between the second access node and the wireless communications device is also reduced at node handover situations.

The reduced signaling has the effect of improved handover performance, e.g. less number of dropped connections for the wireless communications device.

Further, by controlling the transmission of reference signals for mobility according to embodiments herein fewer reference signals for mobility need to be used for handover. Fewer reference signals for mobility relaxes the MRS detection task for the wireless communications device 240 as less number of MRS sequences/signatures has to be matched.

Another advantage of embodiments herein is that the wireless communications device may start evaluation of candidate beams without signaling from the access nodes.

Transmitting the request to transmit the reference signal for mobility on the second beam for mobility 231, 232 may be performed in response to the received request for the mobility action.

Figure 6B:
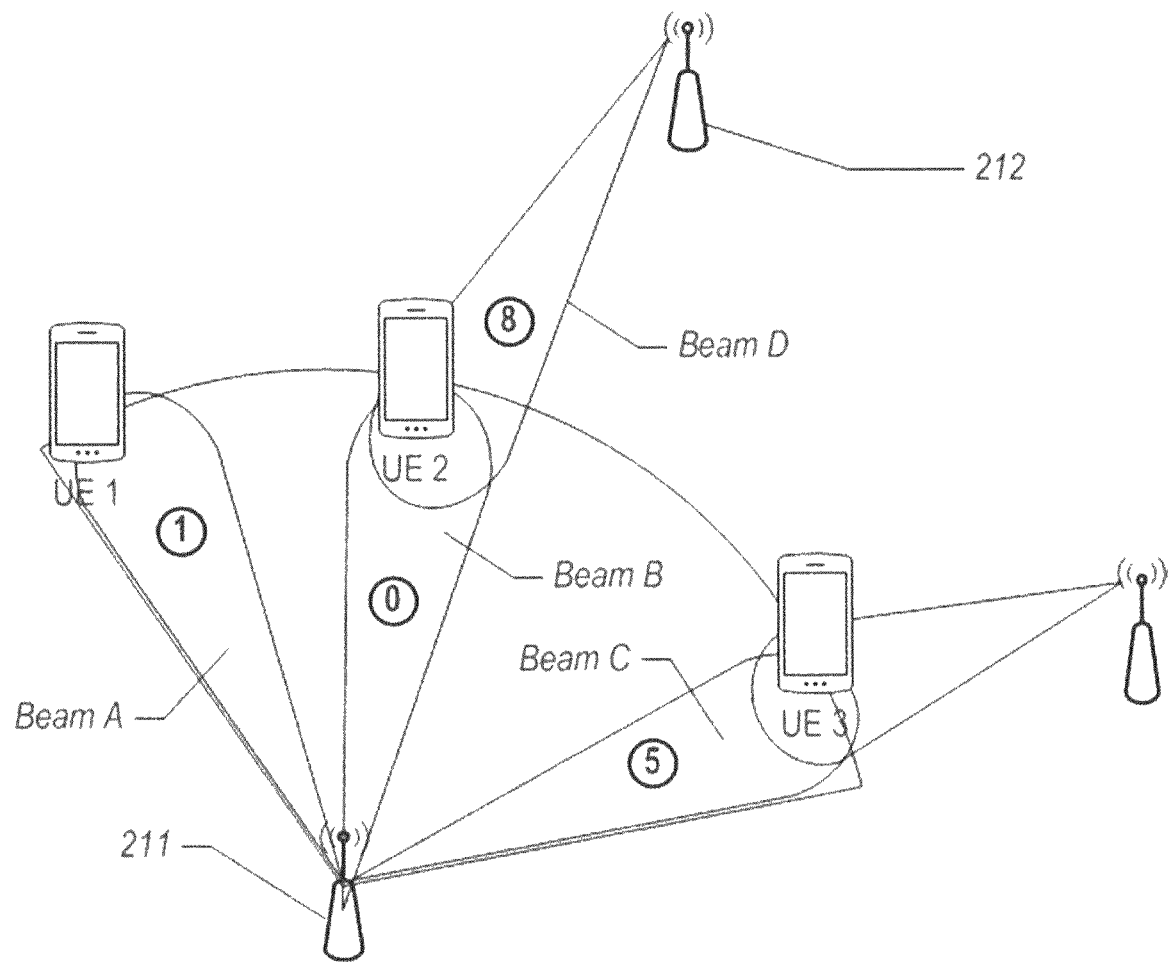
FIG. 6b is a schematic block diagram illustrating embodiments herein.

In some embodiments the request to transmit the reference signal for mobility comprises a prioritisation regarding which of the one or more reference signals for mobility 400-406 to transmit on the second beam for mobility 231, 232. The first access node 211 may offer as many reference signals for mobility as possible to the second access node 212 to avoid that the MRS transmission from the second access node 212 is stalled due to unavailable timeslots. In the example of FIG. 6*b*, MRS ID 1 & 8, using same time allocation, are already used. However, the first access node 211 may offer MRS ID=1 anyway on a low priority as it will most likely not interfere with the ongoing usage of this MRS in beam A as the direction of beam A is different from the direction of beam D.

This action is related to action 506 above.

Action 606

The first access node 211 may receive, from the second access node 212, a confirmation message in response to the request to transmit the reference signal for mobility on the second beam for mobility 231, 232. The confirmation message indicates that the second access node 212 transmits one of the respectively identified one or more reference signals for mobility 400-406 on the second beam for mobility 231, 232.

This action is related to action 507 above.

Figure 7:
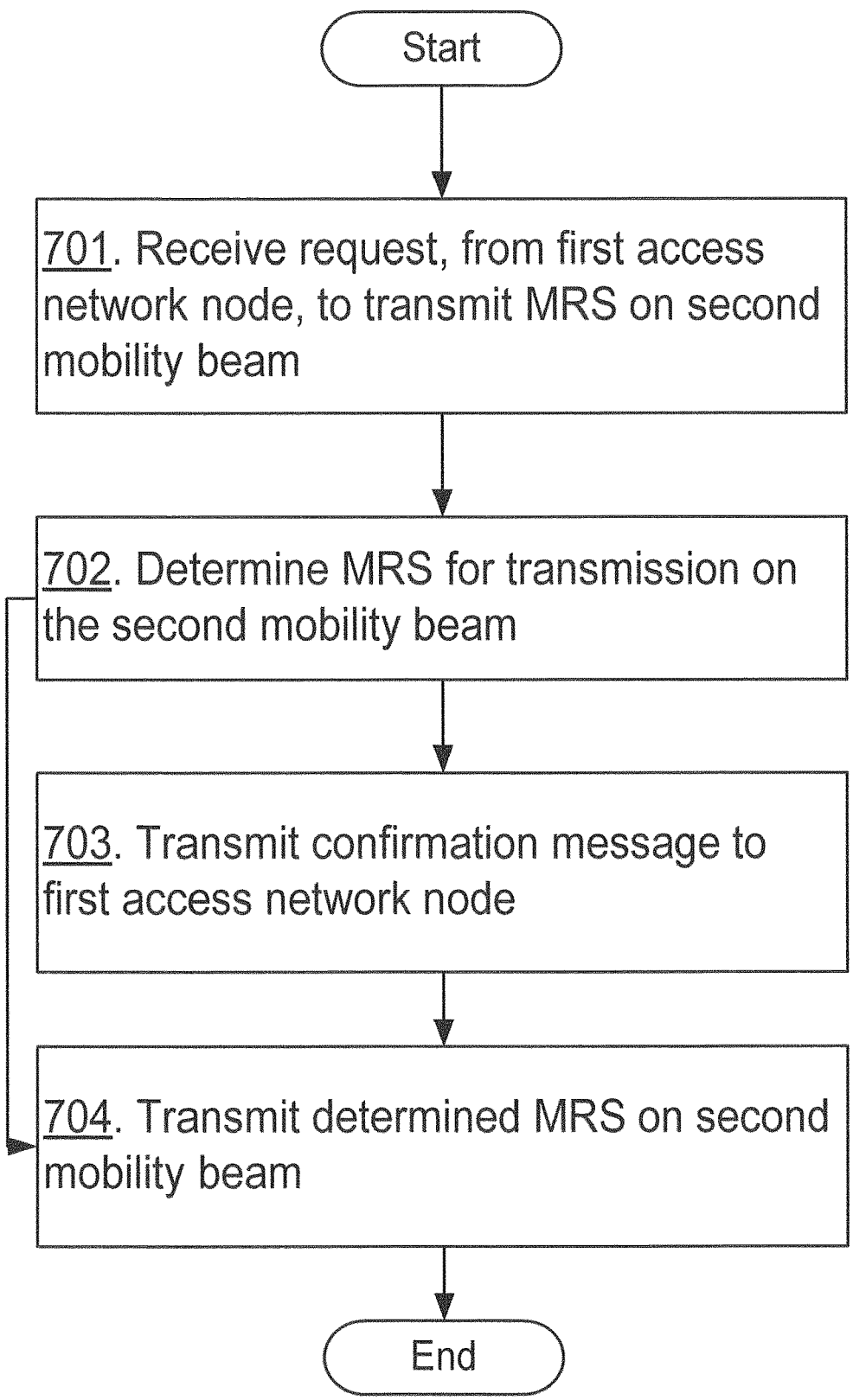
FIG. 7 is a flowchart illustrating embodiments of a method performed by a second access node.

Embodiments for controlling transmission of reference signals for mobility carried by beams for mobility in the wireless communications network 201, will now be described from the point of view of the second access node 212 with reference to the flow chart of FIG. 7.

Action 701

In order for the second access node 212 to use a reference signal for mobility associated with the first access node 211, the second access node 212 receives, from the first access node 211 a request to transmit a reference signal for mobility associated with the first access node 211, on a second beam for mobility 231, 232 associated with the second access node 212. The request comprises:
  a respective identity of one or more reference signals for mobility 400-406 associated with the first access node 211, and
  an identity of the second beam for mobility 231, 232.

This action is related to actions 506 and 605 above.

Action 702

The second access node 212 determines, based on the received respective identity of the one or more reference signals for mobility 400-406, the reference signal for mobility for transmission on the second beam for mobility 231, 232.

This action is related to action 507 above.

Action 703

The second access node 212 may transmit a confirmation message to the first access node 211, in response to the request to transmit the reference signal for mobility on the second beam for mobility 231, 232. The confirmation message indicates that the second access node 212 transmits one of the respectively identified one or more reference signals for mobility 400-406 on the second beam for mobility 231, 232.

In some embodiments the confirmation message comprises a confirmation of which MRS the second access node 212 transmits on the second beam for mobility 221, 222. That is the confirmation message may comprise an indication of, or a mapping between, which MRS it uses on which beam for mobility.

This action is related to action 606 above.

Action 704

The second access node 212 may transmit the determined MRS on the second beam for mobility 231, 232.

This action is related to action 507 above.

Some further optional embodiments related to the second access node 212 and the wireless communications device 240 will now be described with reference to FIG. 8a and FIG. 8b.

Figure 8A:
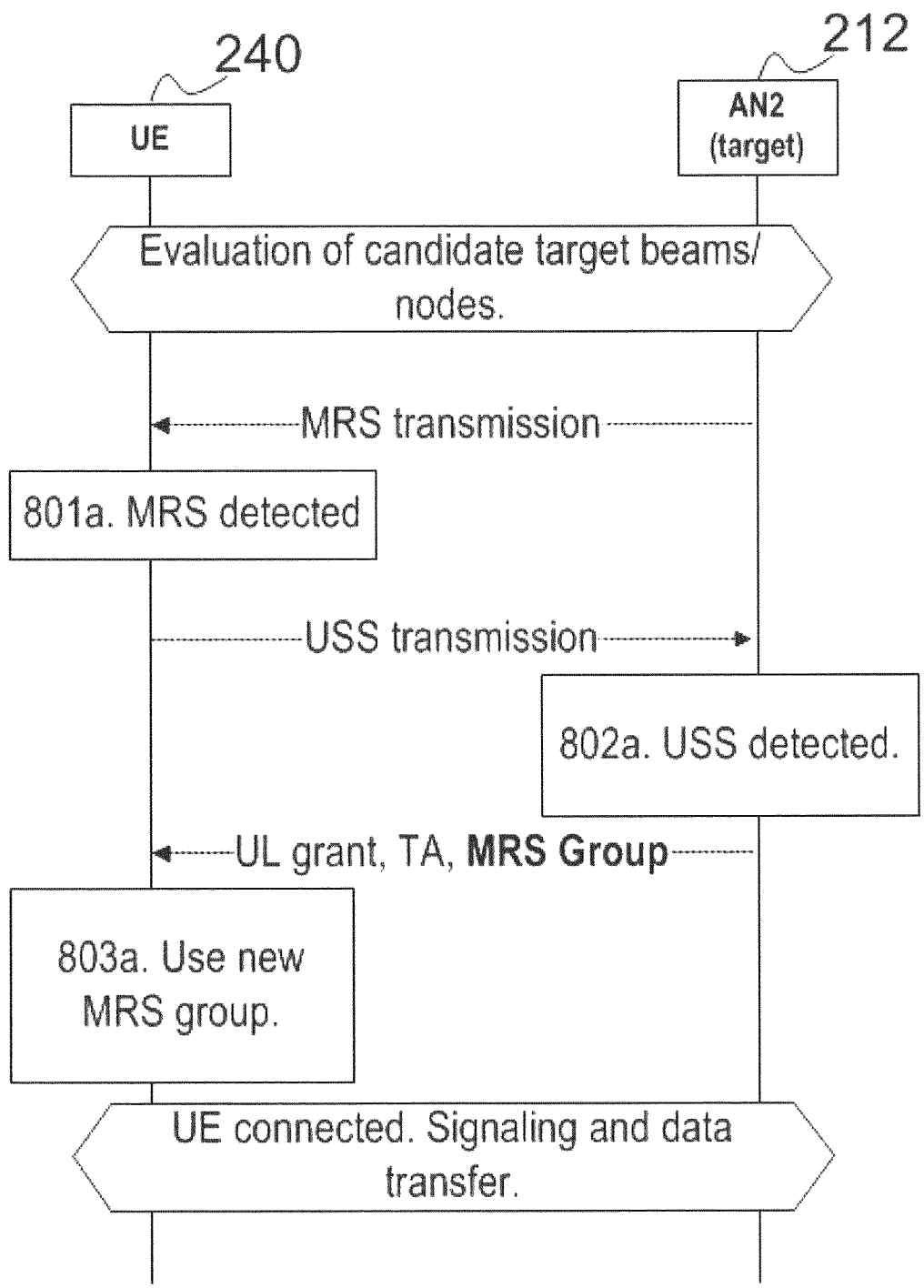
FIG. 8a is a combined flowchart and sequence diagram illustrating embodiments of a method.

FIG. 8a illustrates an optimized way to assign a new MRS group allocation, associated with the second access node 212, to the wireless communications device 240 at a handover scenario. After evaluation of candidate target beams/nodes and after a Mobility Action has been triggered the wireless communications device 240 may establish downlink time synchronization once it has received and detected 801a an MRS from the new MRS group associated with the second access node 212.

To establish uplink synchronization, the wireless communications device 240 transmits a synchronization signal, such as an Uplink Synchronization Signal (USS), e.g. at a predefined time after the MRS from the new MRS group. The USS is detected 802a by the second access node 212 which may, based on the USS receive timing, calculate the timing advance (TA) for uplink transmissions.

The uplink TA and a grant for UL transmission may be sent in a response signal from the second access 212 node to the wireless communications device 240. Thus, UL timing is established to new access node.

In embodiments herein, also the new MRS group, i.e. the identity of the MRS group associated with the second access node 212 may be comprised in the same signal. Once the wireless communications device 240 has received this information and has replaced the MRS group previously received in action 503, it may proceed with signaling towards the second access node 212. The wireless communications device 240 is also able to monitor 803a mobility beams controlled by the second access node 212 based on the MRS group after receiving this information.

By adding the new MRS group to the combined signal for TA and UL grant the wireless communications device 240 is able to switch MRS group immediately when it performs handover to the second access node 212, which makes the handover more efficient.

At this stage the wireless communications device 240 is connected to the new access node and signaling and data transfer may proceed towards new access node.

Figure 8B:
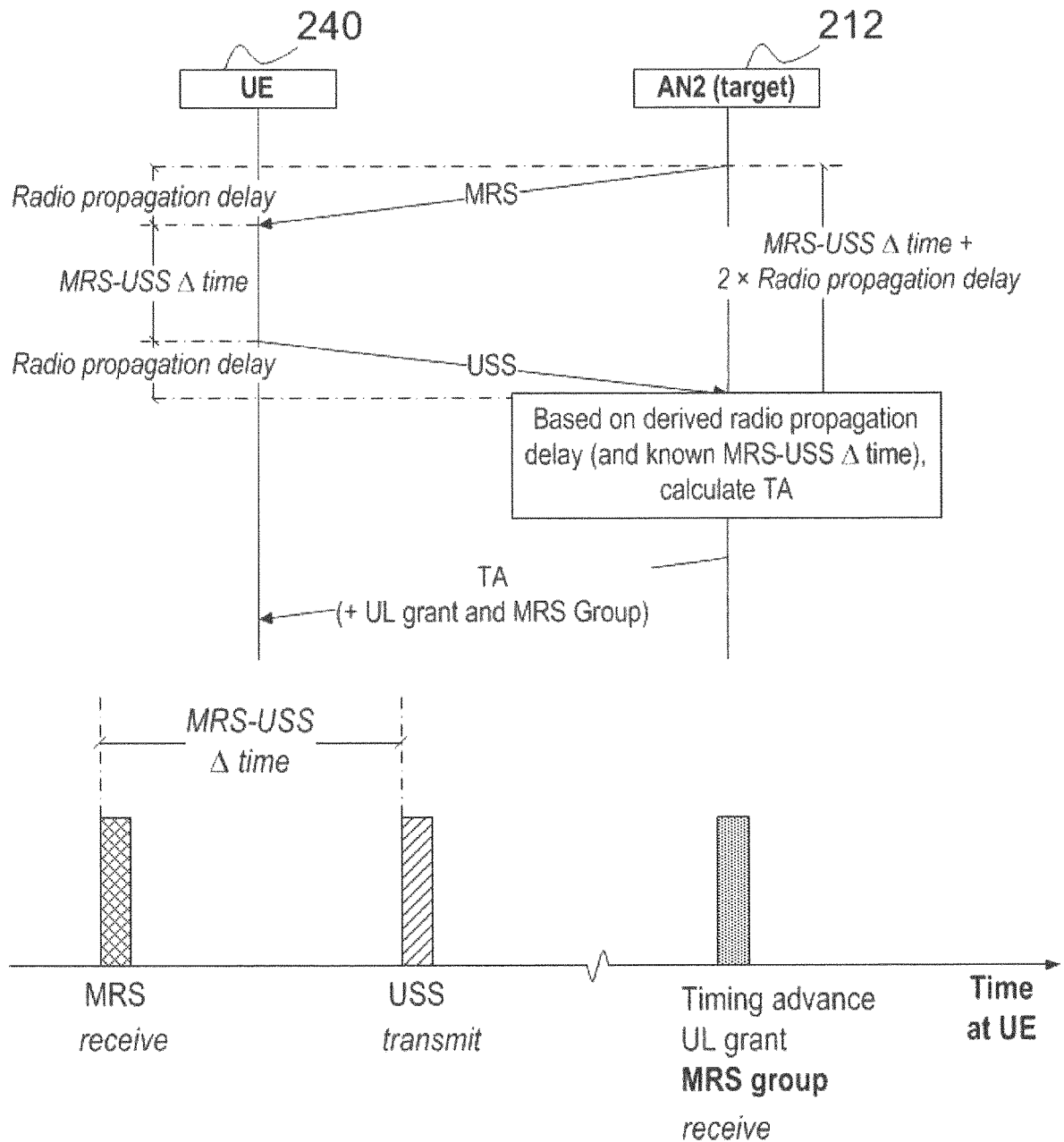
FIG. 8b is a schematic block diagram illustrating transmission timing.

FIG. 8b illustrates the timing relation between the reception of the MRS from the second access node 212, transmission of the USS from the wireless communications device 240 and the reception of the combined signal for TA, UL grant and the MRS group from the second access node 212. MRS-USS A time is the time between the reception of the MRS and the transmission of the USS and is used for calculating the TA. The reception time of the USS at the second access node 212 depends on the propagation delay between the second access node 212 and the wireless communications device 240.

Figure 8C:
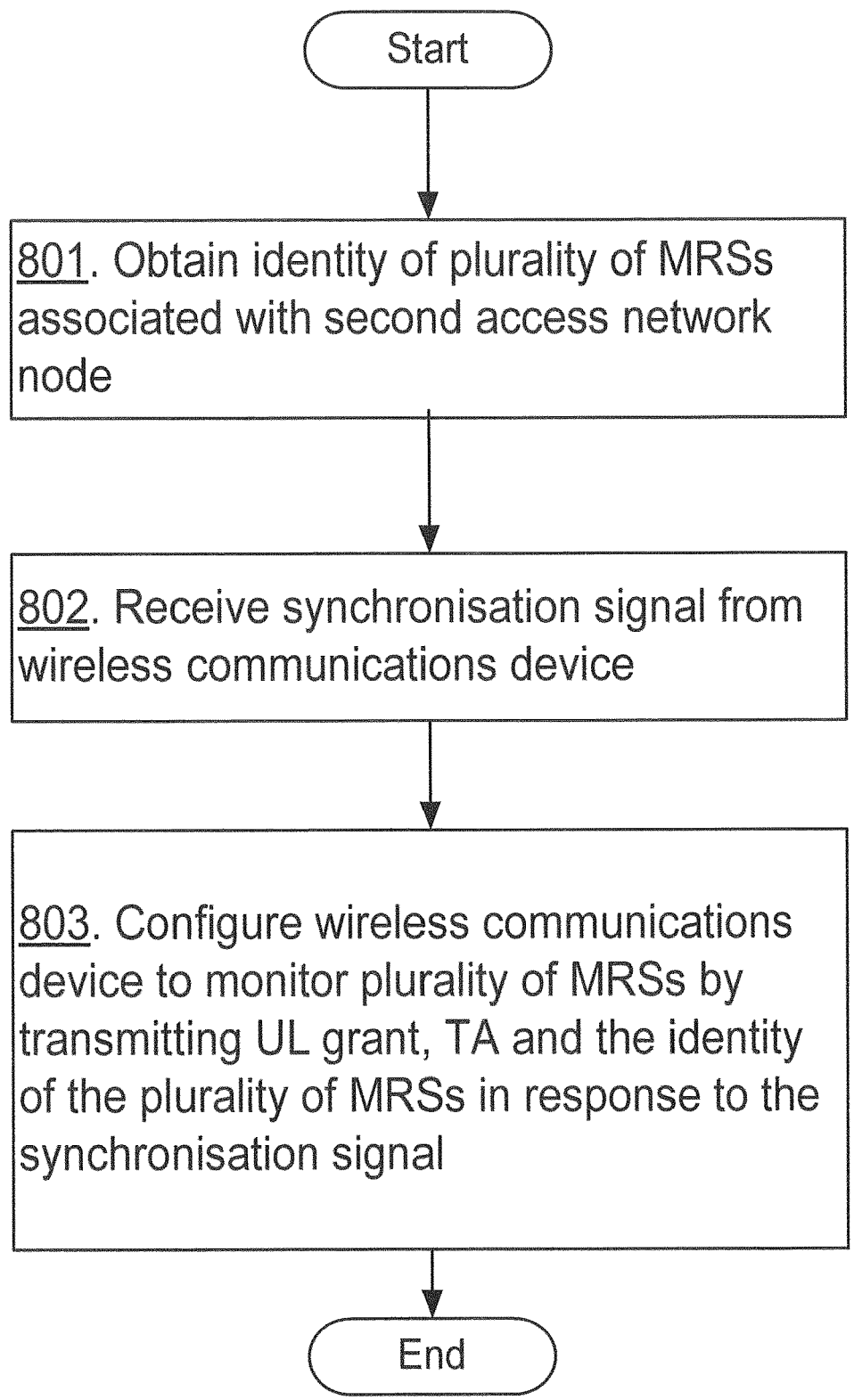
FIG. 8c is a flowchart illustrating further embodiments of a method performed by the second access node.

The above optional embodiments will now be described from the perspective of the the second access node 212 with reference to a flowchart depicted in FIG. 8c.

Action 801

As mentioned above, in order for the second access node 212 to use reference signals for mobility the second access node 212 may obtain an identity of a plurality of reference signals for mobility 414-427 associated with the second access node 212.

This action is related to action 501c above.

Action 802

When it has been determined to handover the wireless communications device 240 to the second access node 212, DL and UL synchronization between the wireless communications device 240 and the second access node 212 may be performed. To establish uplink synchronization the second access node 212 may receive a synchronisation signal from the wireless communication device 240.

This action is related to action 1001 below.

Action 803

In some embodiments the second access node 212 configures the wireless communication device 240 to monitor individual reference signals for mobility 414-427, comprised in the plurality of reference signals for mobility 414-427 associated with the second access node 212, on beams for mobility 231, 232 associated with the second access node 212. The configuring is performed by transmitting, to the wireless communication device 240, an uplink grant, a timing advance and the identity of the plurality of reference signals for mobility 414-427 associated with the second access node 212 in a response to the synchronisation signal. Configuring 803 the wireless communication device 240 to monitor individual reference signals for mobility 414-427 is based on a relation between the identity of the plurality of reference signals for mobility 414-427 associated with the second access node 212 and respective identities of individual reference signals for mobility 414-427 comprised in the plurality of reference signals for mobility 414-427.

Since the second access node 212 transmits the identity of the plurality of reference signals for mobility 414-427 instead of the individual identities second access node 212 may use layer 1 or layer 2 signalling to transmit the information. As a consequence, the identity of an MRS group may be signalled together with the uplink grant and the timing advance, thus saving radio resources. Another advantage of the above procedure is that the wireless communications device 240 may monitor beams for mobility from the second access node 212 faster.

This action is related to action 1002 below.

Figure 9:
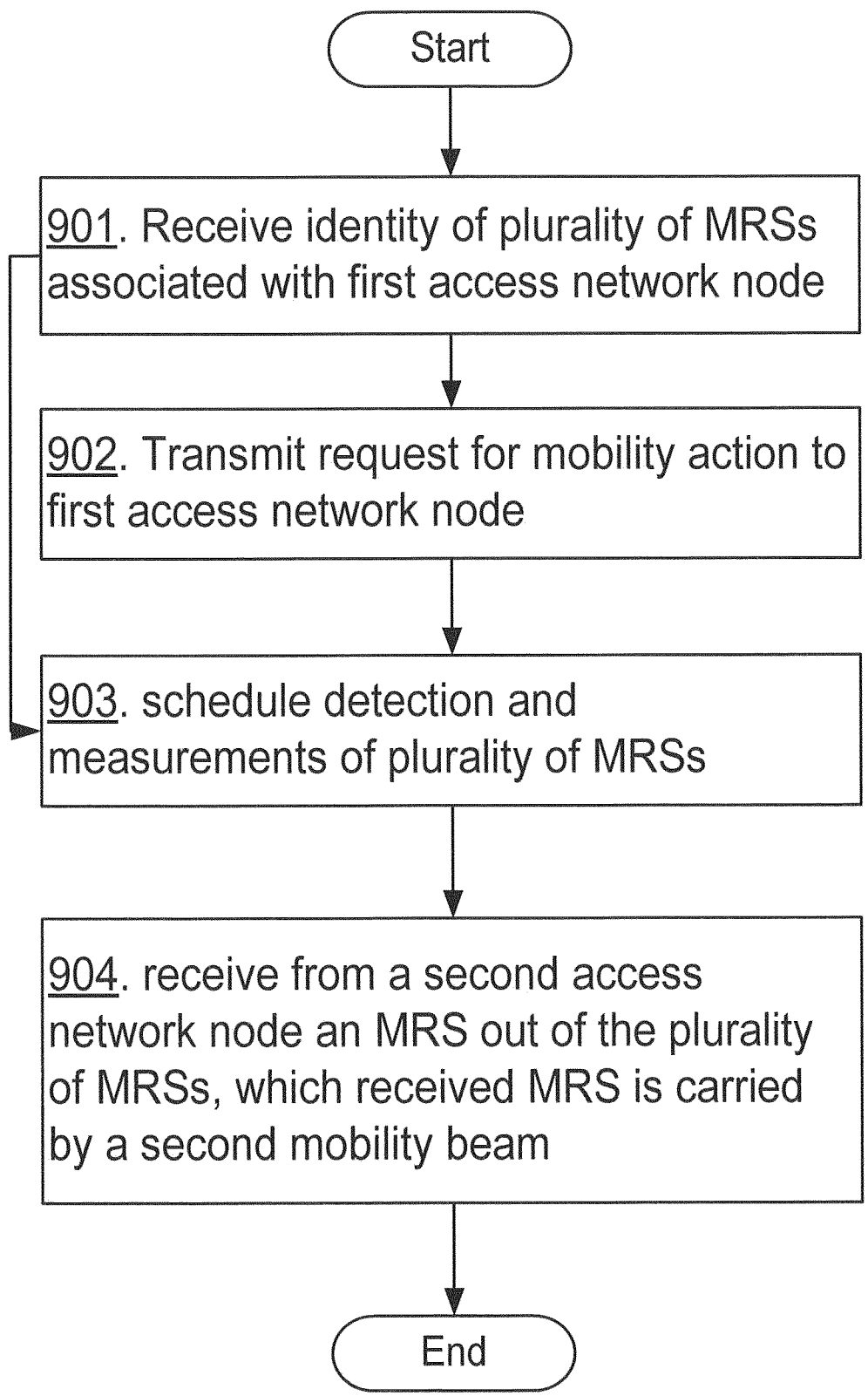
FIG. 9 is a flowchart illustrating embodiments of a method performed by a wireless communications device.

Embodiments for receiving reference signals for mobility carried by beams for mobility in the wireless communications network 201, will now be described from the point of view of the wireless communications device 240 with reference to a flow chart in FIG. 9.

Action 901

As mentioned above, in order to be able to monitor reference signals for mobility the wireless communications device 240 receives, from the first access node 211, the identity of the plurality of reference signals for mobility 400-413 associated with the first access node 211.

This action is related to actions 503 and 603 above.

Action 902

If the wireless communications device 240 detects that the quality of a radio link between the wireless communications device 240 and the first access node 211 drops below a threshold, the wireless communications device 240 may transmit a request for a mobility action to the first access node 211.

This action is related to actions 504 and 604 above.

Action 903

The wireless communications device 240 schedules detection and measurements of respective individual reference signals for mobility 400-413, comprised in the plurality of reference signals for mobility 400-413 associated with the first access node 211. The scheduling is based on the relation between the identity of the plurality of reference signals for mobility 400-413 associated with the first access node 211, and respective identities of individual reference signals for mobility 400-413 comprised in the plurality of reference signals for mobility 400-413 associated with the first access node 211.

This action is related to action 505 above.

Action 904

The wireless communications device 240 receives beams for mobility from different possible target nodes, such as the second access node 212. As mentioned above this is done in order for the wireless communications device 240 to evaluate how suitable the possible target nodes are for handover.

In particular, the wireless communications device 240 receives the beam for mobility 231, 232 associated with the second access node 212. However, at this moment the wireless communications device 240 is adapted to receive reference signals for mobility from the first access node 211, but not from the second access node 212. Therefore, the wireless communications device 240 receives a reference signal for mobility out of the plurality of reference signals for mobility 400-413 associated with the first access node 211. The MRS is received on the beam for mobility 231, 232 associated with the second access node 212.

The wireless communications device 240 may receive the reference signal for mobility on the beam for mobility 231, 232 associated with the second access node 212, in response to the transmitted request for the mobility action.

Since the wireless communications device 240 receives the reference signal for mobility associated with the first access node 211 on the beam for mobility 231, 232 associated with the second access node 212 the signalling between the wireless communications device 240 and the wireless communications network 201 is reduced. For example, the signalling between the wireless communications device 240 and the second access node 212 is reduced.

Further, the wireless communications device 240 evaluates candidate beams for mobility, such as the beam for mobility 231, 232 associated with the second access node 212, faster since the wireless communications device 240 does not need to communicate with the second access node 212.

This action is related to action 704 above.

Figure 10:
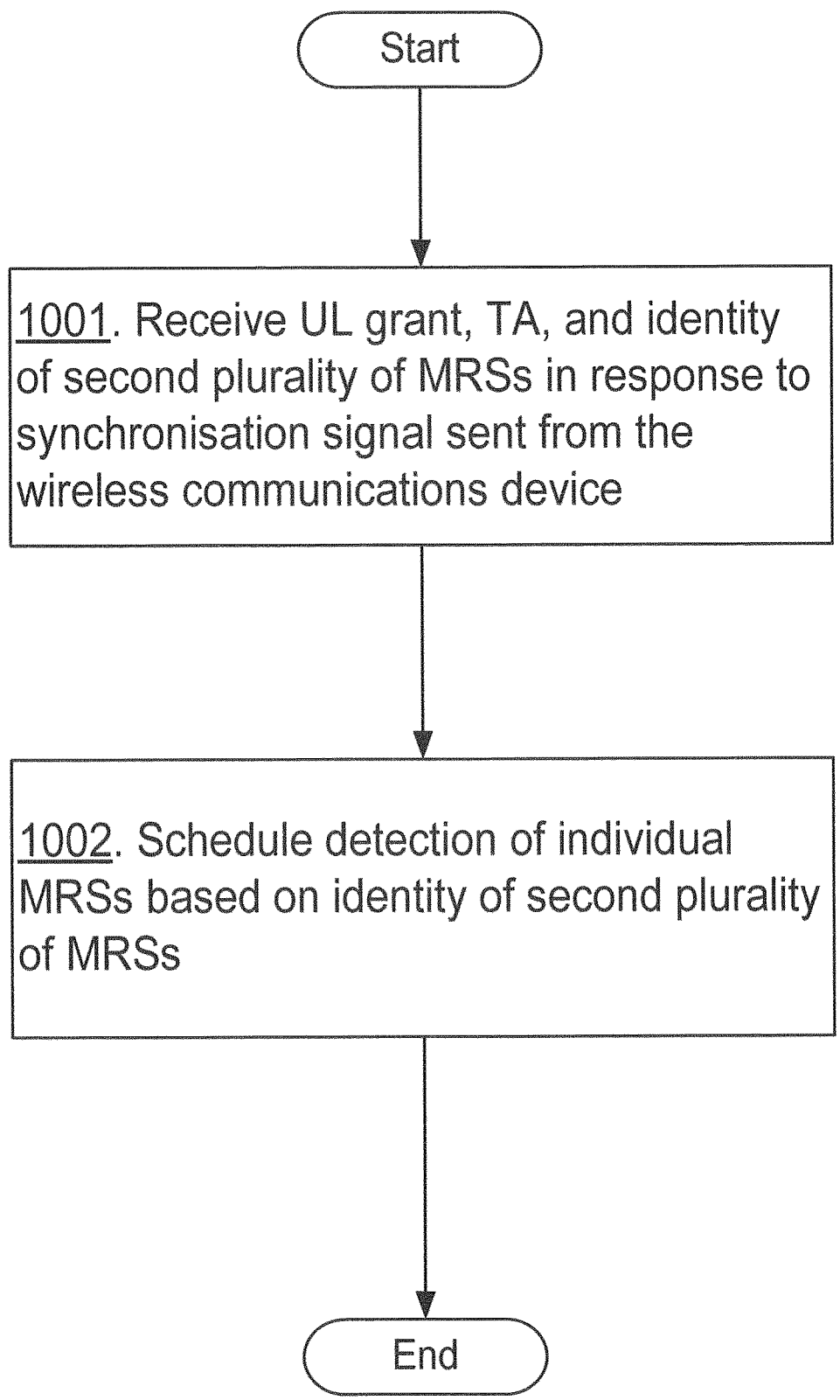
FIG. 10 is a flowchart illustrating further embodiments of a method performed by the wireless communications device.

The above optional embodiments described with reference to FIGS. 8a-8c will now be described from the perspective of the wireless communications device 240 with reference to a flowchart depicted in FIG. 10.

Action 1001

In some embodiments the wireless communications device 240 receives from the second access node 212, an uplink grant, a timing advance and a second identity of a second plurality of reference signals for mobility 414-427 associated with the second access node 112, in a response to a synchronisation signal.

This action is related to action 802 above.

Action 1002

If the wireless communications device 240 has received the uplink grant, the timing advance and the second identity of the second plurality of reference signals for mobility 414-427, then the wireless communications device 240 may schedule detection and measurements of respective individual reference signals for mobility 414-427, comprised in the second plurality of reference signals for mobility 414-427. The scheduling is based on a relation between the second identity of the second plurality of reference signals for mobility 414-427 and respective identities of individual reference signals for mobility 414-427 comprised in the second plurality of reference signals for mobility 414-427.

This action is related to action 803 above.

Figure 11:
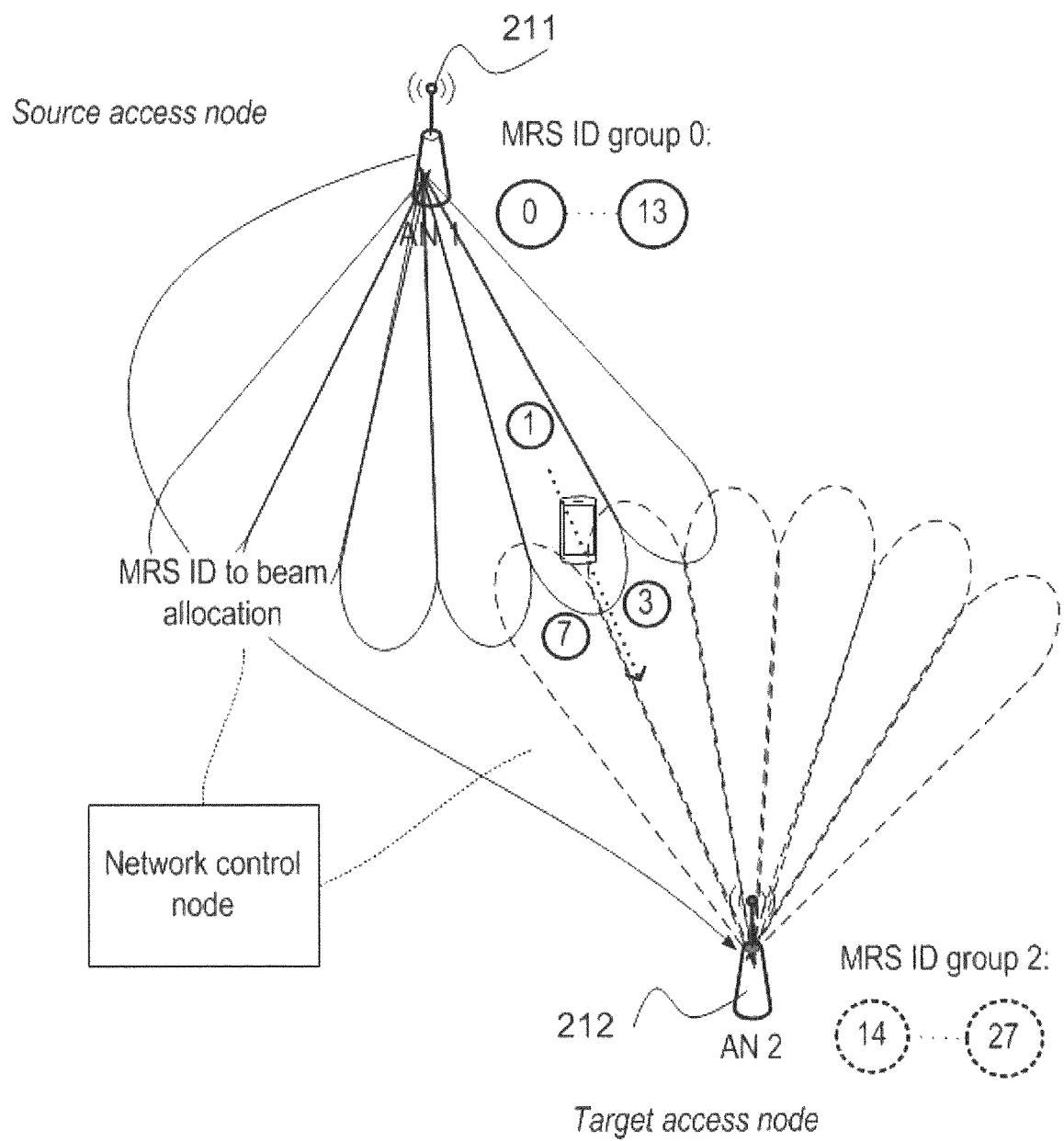
FIG. 11 is a schematic block diagram illustrating MRS lending from source to target access node at handover.

FIG. 11 illustrates an example of lending MRSs from a source to a target access node at handover. That is, FIG. 11 illustrates an example of embodiments herein. In an example scenario the wireless communication device 240, connected to the first access node 211, suffers from degraded link performance and request evaluation of potential candidate beams/nodes. The first access node 211, which have been allocated MRS Id group 0, activates MRS transmission on a first mobility beam 1 in the first access node 211. From the local beam neighbour list, the first access node 211 knows that there are two neighbor mobility beams 3, 7 in the second access node 212. The second access node 212 has been allocated MRS Id group 2 comprising MRS ids 14-27 Using signaling over the transport network, either directly or via a central network control node, the first access node 211 requests MRS transmission from the neighbour beams in the second access node 212, using MRS IDs from the MRS ID group 0, i.e. from the MRS IDs allocated to the first access node 211.

Figure 12:
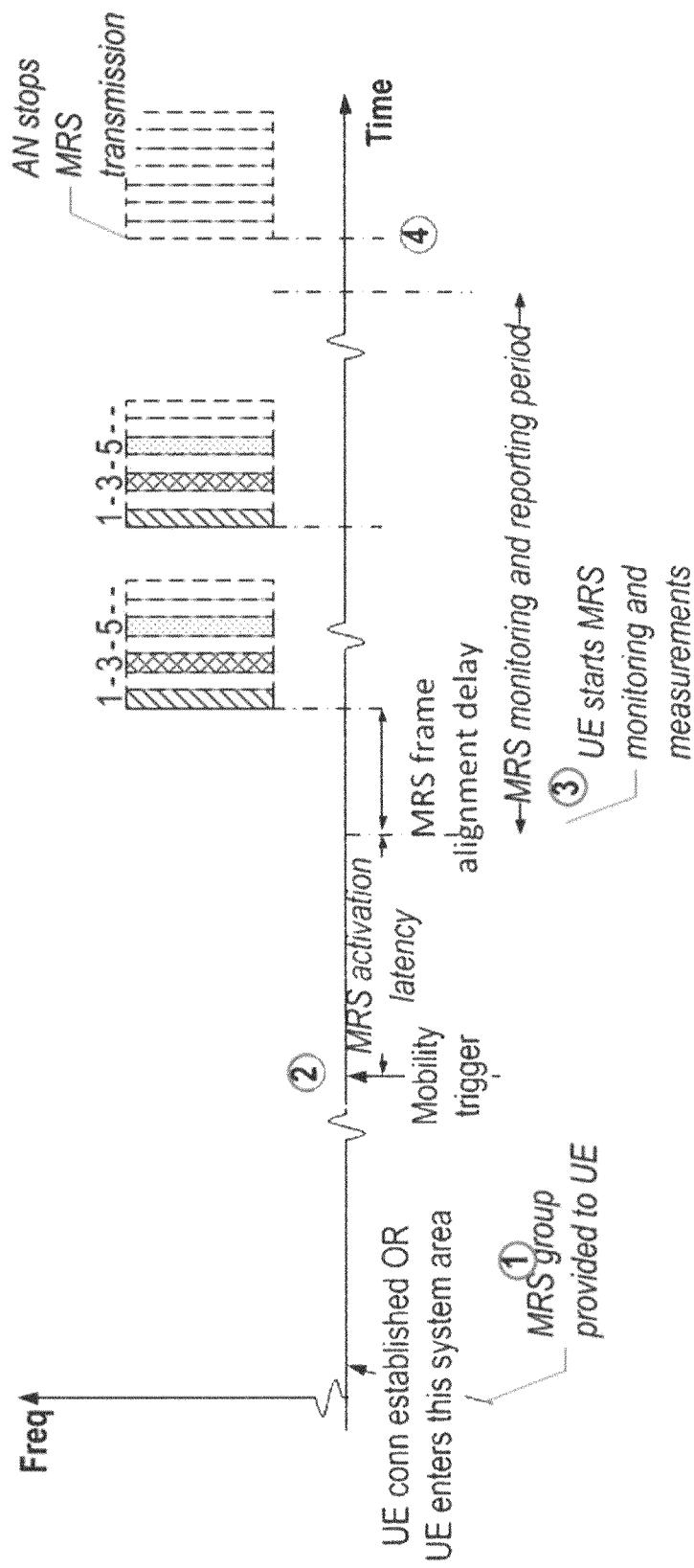
FIG. 12 is a schematic block diagram illustrating a timeline for a handover.

To minimize signaling at the handover situation, the MRS activation/deactivation and the MRS measurement and reporting may be time-based from the time of the mobility trigger condition as described in detail for FIG. 12. However, signaling between the access nodes may still be kept as mentioned in relation to FIG. 5a.

FIG. 12 shows a timeline indicating the events for a UE handover scenario. The numbers below refers to the numbers in circles in FIG. 12.

1. At connection establishment or when the wireless communication device 240 enters the coverage area 331, it is provided with the MRS group to be used. From this group identity and earlier system information, the wireless communication device 240 may derive the applicable MRS IDs to be used in case of a handover situation.

2. Quality of the connection is worse than a trigger threshold. The wireless communication device 240 signals to the first access node 211 that it needs evaluation of alternative beams. From step 1, the wireless communication device 240 already knows the limited set of potential MRSs to monitor.

3. As there is a delay for MRS activation, the wireless communication device 240 may not start MRS monitoring until a specific timer, e.g. specified by a predefined system constant or system information, has expired. Then the wireless communication device 240 may continue to measure and evaluate MRSs for a predefined time, which also may be altered/changed by system information. Due to mis-alignment with the MRS transmission cycle, there may be some delay until the first MRS is transmitted. In the example, MRS Id 1, 3 and 5 are transmitted at their corresponding symbol time.

4. When the timer for the MRS monitoring and reporting period has expired, the system stops the MRS transmission. It may stop it earlier in case handover decision already is taken.

In summary, as the MRS usage may be dynamic and flexible within an access node, a source access node may be unaware of the MRSs used in a beam in a potential target access node to which the wireless communications device 240 may perform handover. In embodiments herein, the source node is responsible to assign MRSs also for the target node instead of using MRSs from the pool of MRSs in the target node.

Some expected benefits of embodiments herein are significantly lower network energy consumption, better scalability, higher degree of forward compatibility during a RAT evolution phase, lower interference from system overhead signals and consequently higher throughput in a low load scenario, and improved support for user centric beamforming.

Figure 13:
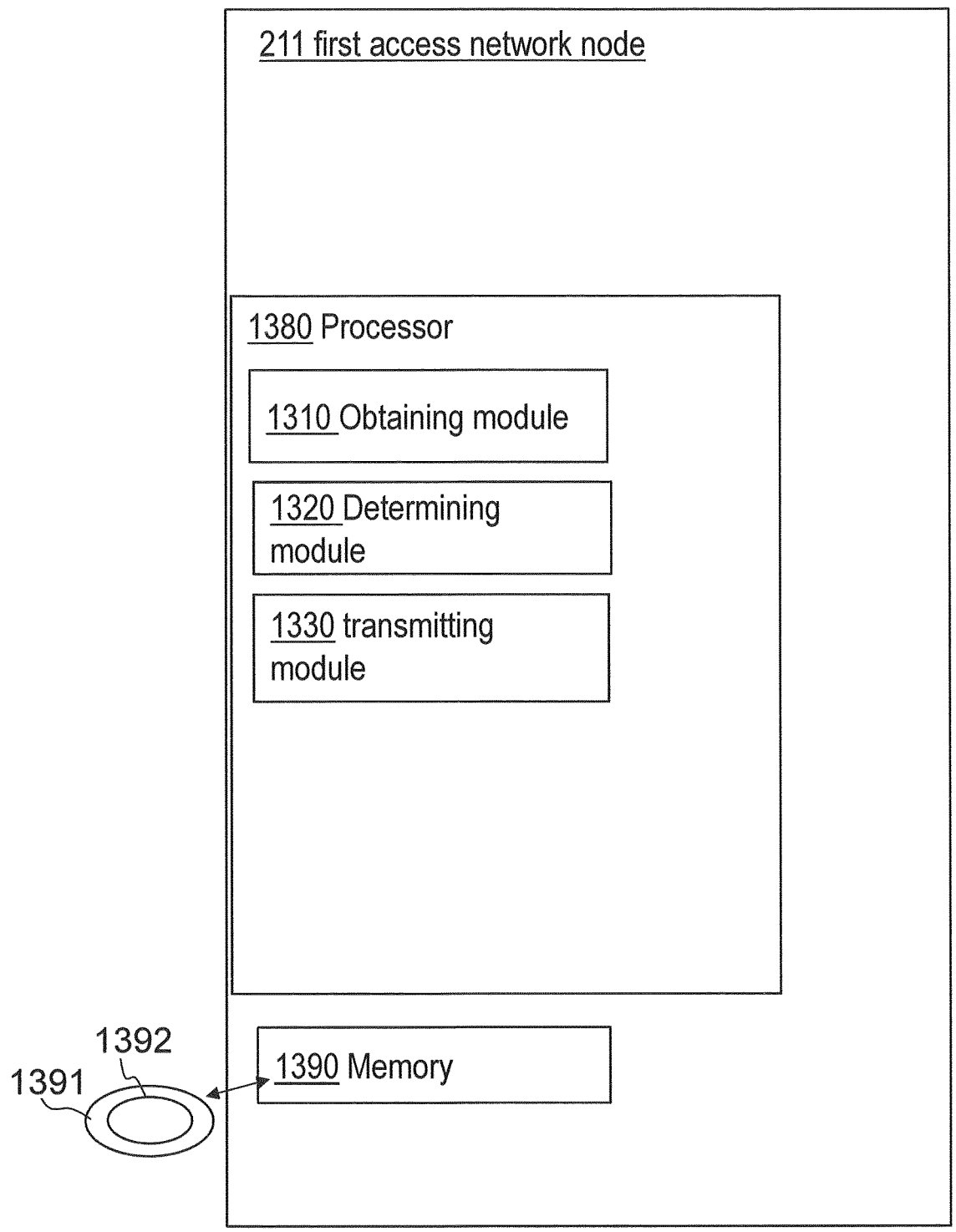
FIG. 13 is a schematic block diagram illustrating embodiments of a first access node.

To perform the method actions for controlling transmission of reference signals for mobility carried by beams for mobility in the wireless communications network 201 described above in relation to FIG. 6*a*, the first access node 211 may comprise the following arrangement depicted in FIG. 13.

The first access node 211 is adapted to, e.g. by means of an obtaining module 1310 adapted to, obtain an identity of a plurality of reference signals for mobility 400-413 associated with the first access node 211, and to obtain an identity of a plurality of reference signals for mobility 400-413 associated with the first access node 211.

The first access node 211 is further adapted to, e.g. by means of a determining module 1320 adapted to, determine an identity of a second beam for mobility 231, 232 associated with a second access node 212, which second beam for mobility 231, 232 is a neighbour beam for mobility to a first beam for mobility 221, 222 associated with the first access node 211, wherein the identity of the second beam for mobility 231, 232 is determined based on a neighbour relation between the second beam for mobility 231, 232 and the first beam for mobility 221, 222.

The first access node 211 is further adapted to, e.g. by means of a transmitting module 1330 adapted to, control the transmission of reference signals for mobility by transmitting, to the second access node 212, a request to transmit a reference signal for mobility comprised in the plurality of reference signals for mobility 400-413, on the second beam for mobility 231, 232, and wherein the request comprises:

a respective identity of one or more reference signals for mobility 400-406 comprised in the plurality of reference signals for mobility 400-413, which respective identity is based on the identity of the plurality of reference signals for mobility 400-413, and the identity of the second beam for mobility 231, 232.

In some embodiments the request to transmit the reference signal for mobility comprises a prioritisation regarding which of the one or more reference signals for mobility 400-406 to transmit on the second beam for mobility 231, 232.

The first access node 211 may be further adapted to, e.g. by means of the obtaining module 1310 adapted to, receive, from the second access node 212, a confirmation message in response to the request to transmit the reference signal for mobility on the second beam for mobility 231, 232, which confirmation message indicates that the second access node 212 transmits one of the respectively identified one or more reference signals for mobility 400-406 on the second beam for mobility 231, 232.

The first access node 211 may be further adapted to, e.g. by means of the transmitting module 1330 adapted to, configure a wireless communication device 240 to receive the plurality of reference signals for mobility 400-413 by transmitting the identity of the plurality of reference signals for mobility 400-413 to the wireless communication device 240. Then the first access node 211 may be further adapted to, e.g. by means of the obtaining module 1310 adapted to, receive a request for a mobility action from the wireless communication device 240.

If the first access node 211 has received the request for the mobility action from the wireless communication device 240 then the first access node 211 may be further adapted to, e.g. by means of the transmitting module 1330 adapted to, transmit the request to transmit the reference signal for mobility on the second beam for mobility 231, 232 in response to the received request for the mobility action.

Figure 14:
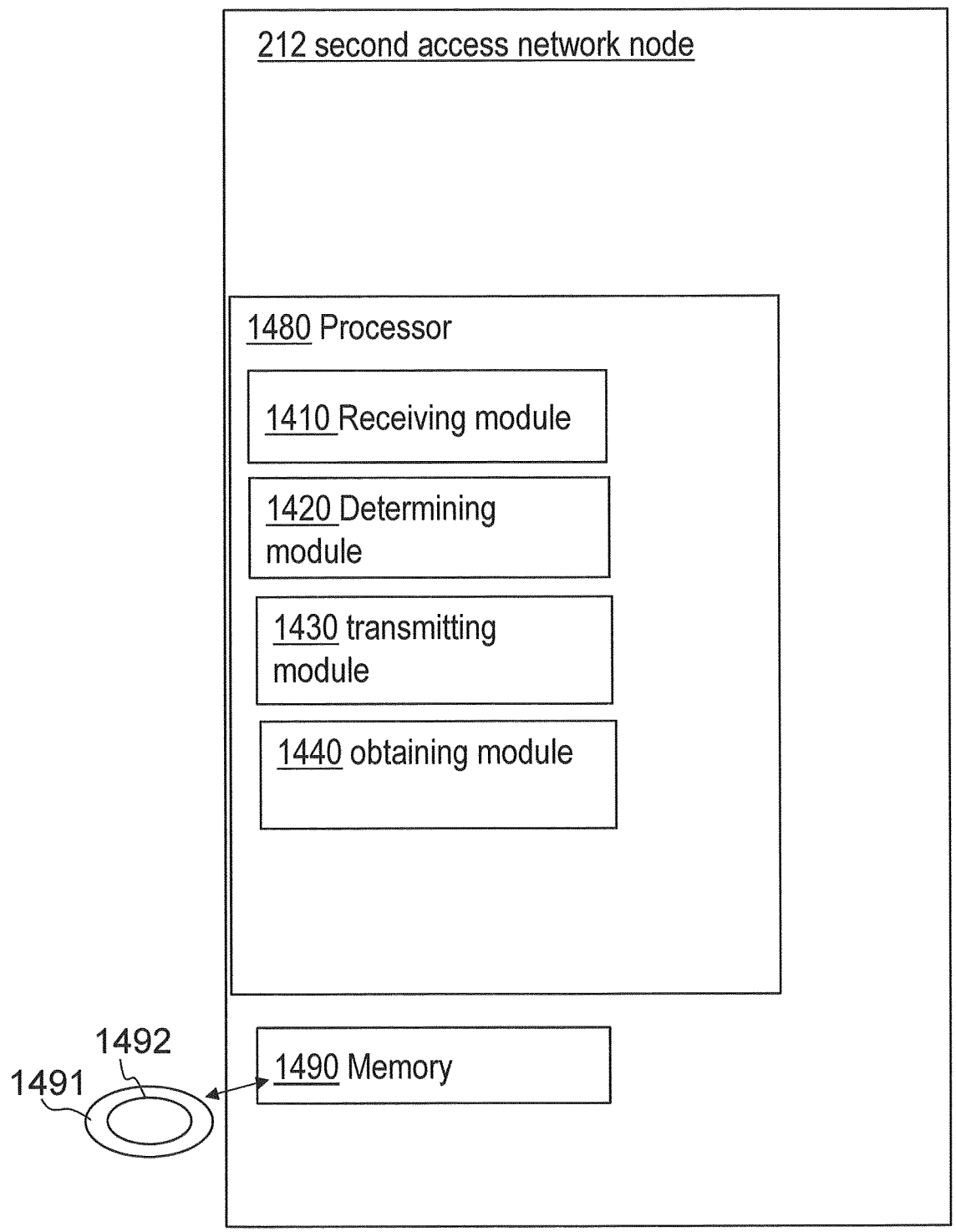
FIG. 14 is a schematic block diagram illustrating embodiments of a second access node.

To perform the method actions for controlling transmission of reference signals for mobility carried by beams for mobility in the wireless communications network 201 described above in relation to FIGS. 7 and 8*a*-8*c*, the second access node 212 may comprise the following arrangement depicted in FIG. 14.

The second access node 212 is adapted to, e.g. by means of a receiving module 1410 adapted to, receive, from a first access node 211 a request to transmit a reference signal for mobility associated with the first access node 211, on a second beam for mobility 231, 232 associated with the second access node 212, which request comprises:

a respective identity of one or more reference signals for mobility 400-406 associated with the first access node 211, and an identity of the second beam for mobility 231, 232.

The second access node 212 is further adapted to, e.g. by means of a determining module 1420 adapted to, determine, based on the received respective identity of the one or more reference signals for mobility 400-406, the reference signal for mobility for transmission on the second beam for mobility 231, 232.

The second access node 212 is further adapted to, e.g. by means of a transmitting module 1430 adapted to, transmit the determined MRS on the second beam for mobility 231, 232.

In some embodiments the second access node 212 is further adapted to, e.g. by means of the transmitting module 1430 adapted to, transmit the confirmation message to the first access node 211, in response to the request to transmit the reference signal for mobility on the second beam for mobility 231, 232. The confirmation message indicates that the second access node 212 transmits one of the respectively identified one or more reference signals for mobility 400-406 on the second beam for mobility 231, 232.

The second access node 212 may be further adapted to, e.g. by means of the obtaining module 1440 adapted to, obtain the identity of the plurality of reference signals for mobility 414-427 associated with the second access node 212.

In some embodiments the second access node 212 is further adapted to, e.g. by means of the receiving module 1410 adapted to, receive a synchronisation signal from the wireless communication device 240.

In some embodiments the second access node 212 is further adapted to, e.g. by means of the transmitting module 1430 adapted to, configure a wireless communication device 240 to monitor individual reference signals for mobility 414-427, comprised in the plurality of reference signals for mobility 414-427, on beams for mobility 231, 232 associated with the second access node 212 by transmitting, to the wireless communication device 240, an uplink grant, a timing advance and the identity of the plurality of reference signals for mobility 414-427 in a response to the synchronisation signal, wherein configuring 803 the wireless communication device 240 to monitor individual reference signals for mobility 414-427 is based on a relation between the identity of the plurality of reference signals for mobility 414-427 and respective identities of individual reference signals for mobility 414-427 comprised in the plurality of reference signals for mobility 414-427.

Figure 15:
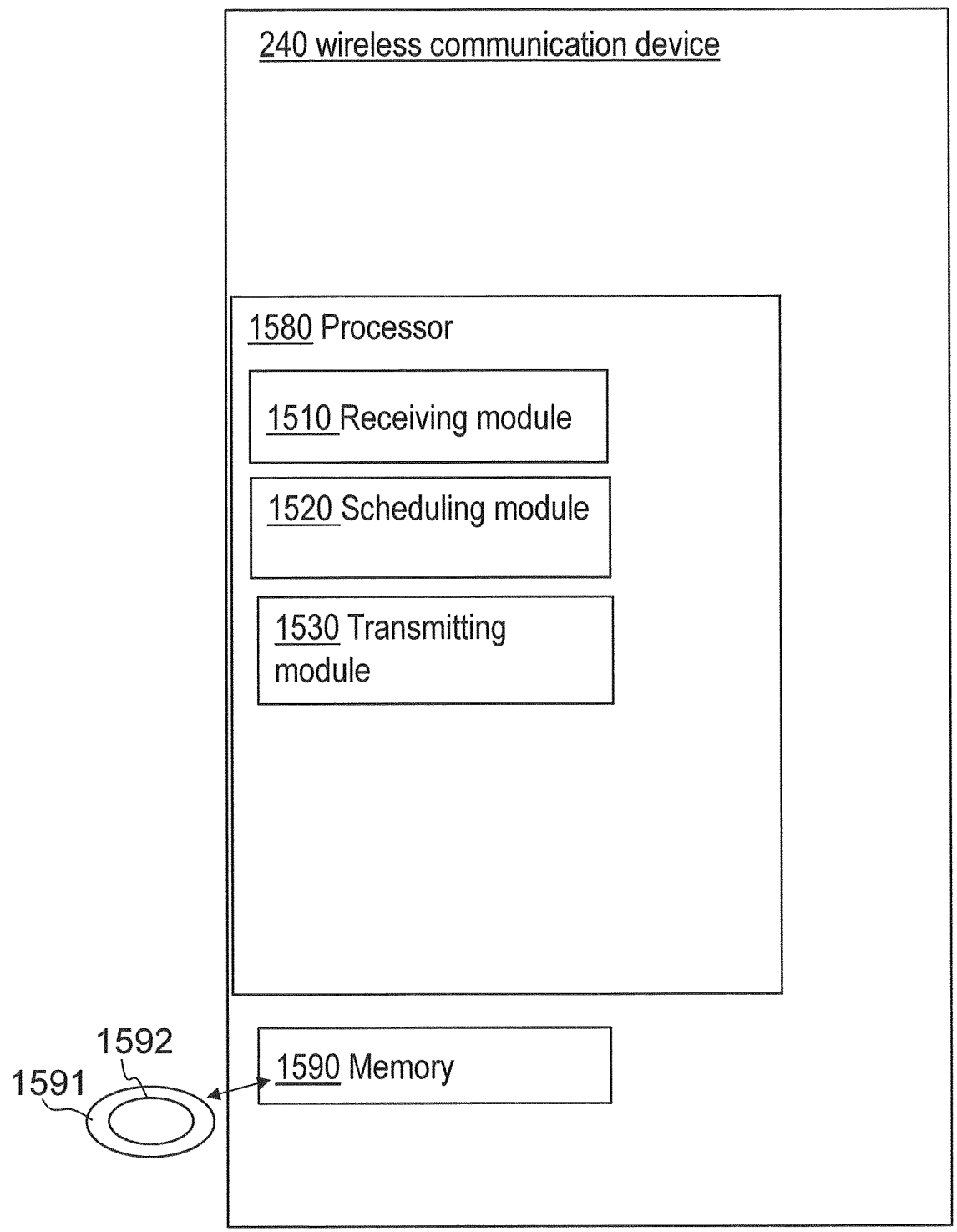
FIG. 15 is a schematic block diagram illustrating embodiments of a wireless communications device.

To perform the method actions for receiving reference signals for mobility in the wireless communications network 201 described above in relation to FIGS. 9 and 10, the wireless communication device 240 may comprise the following arrangement depicted in FIG. 15.

The wireless communication device 240 is adapted to, e.g. by means of a receiving module 1510 adapted to, receive, e.g. from the first access node 211, an identity of a plurality of reference signals for mobility 400-413 associated with the first access node 211.

The wireless communication device 240 is further adapted to, e.g. by means of a scheduling module 1520 adapted to, schedule, based on a relation between the identity of the plurality of reference signals for mobility 400-413 and respective identities of individual reference signals for mobility 400-413 comprised in the plurality 400-413 of reference signals for mobility, detection and measurements of respective individual reference signals for mobility 400-413, comprised in the plurality of reference signals for mobility 400-413.

The wireless communication device 240 is further adapted to, e.g. by means of the receiving module 1510 adapted to, receive a reference signal for mobility out of the plurality of reference signals for mobility 400-413, which MRS is received on a beam for mobility 231, 232 associated with the second access node 212.

In some embodiments the wireless communication device 240 is further adapted to, e.g. by means of a transmitting module 1530 adapted to, transmit a request for a mobility action to the first access node 211, and receiving the reference signal for mobility on the beam for mobility 231, 232 associated with the second access node 212, in response to the transmitted request for the mobility action.

In some embodiments the second access node 212 is further adapted to, e.g. by means of the receiving module 1510 adapted to, receive, from the second access node 212, an uplink grant, a timing advance and a second identity of a second plurality of reference signals for mobility 414-427 associated with the second access node 112, in a response to a synchronisation signal, and further adapted to, e.g. by means of the scheduling module 1520 adapted to, schedule, based on a relation between the second identity of the second plurality of reference signals for mobility 414-427 and respective identities of individual reference signals for mobility 414-427 comprised in the second plurality of reference signals for mobility 414-427, detection and measurements of respective individual reference signals for mobility 414-427, comprised in the second plurality of reference signals for mobility 414-427.

The embodiments herein may be implemented through one or more processors, such as the processors 1380, 1480 in the first and second access nodes 211, 212 depicted in FIGS. 13 and 14, and the processor 1580 in the wireless communication device 240 depicted in FIG. 15 together with computer program code for performing the functions and actions of the embodiments herein. The program code mentioned above may also be provided as a computer program product 1391, 1491, 1591 for instance in the form of a data carrier carrying computer program code 1392, 1492, 1592 for performing the embodiments herein when being loaded into the first and second access nodes 211, 212 and the wireless communication device 240. One such carrier may be in the form of a CD ROM disc. It is however feasible with other data carriers such as a memory stick. The computer program code may furthermore be provided as pure program code on a server and downloaded to the first and second access nodes 211, 212 and the wireless communication device 240.

Thus, the methods according to the embodiments described herein for the first and second access nodes 211, 212 and the wireless communication device 240 may be implemented by means of a computer program product, comprising instructions, i.e., software code portions, which, when executed on at least one processor, cause the at least one processor to carry out the actions described herein, as performed by the first and second access nodes 211, 212 and the wireless communication device 240. The computer program product may be stored on a computer-readable storage medium. The computer-readable storage medium, having stored there on the computer program, may comprise the instructions which, when executed on at least one processor, cause the at least one processor to carry out the actions described herein, as performed by the first and second access nodes 211, 212 and the wireless communication device 240. In some embodiments, the computer-readable storage medium may be a non-transitory computer-readable storage medium.

The first and second access nodes 211, 212 and the wireless communications device 240 may further each comprise a memory 1390, 1490, 1590 comprising one or more memory units. The memory 1390, 1490, 1590 is arranged to be used to store obtained information such as MRS Ids, MRS groups, neighbour relations, measurements of signal, thresholds for mobility handover evaluation, configurations and applications etc. to perform the methods herein when being executed in the first and second access nodes 211, 212 and the wireless communications device 240.

Those skilled in the art will also appreciate that the different modules described above may refer to a combination of analog and digital circuits, and/or one or more processors configured with software and/or firmware, e.g. stored in the memory, that when executed by the one or more processors, such as the processors in the first and second access nodes 211, 212 and the wireless communication device 240 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope.

Although specific terms may be employed herein, they are used in a generic and descriptive sense only and not for purposes of limitation.

Therefore, the above embodiments should not be taken as limiting the scope, which is defined by the appending claims.

Note that although terminology from 5G/NR has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first access node and a second access node should be considered to be non-limiting and does in particular not imply a certain hierarchical relation between the two.

The invention claimed is:

1. A method, performed by a first access node, for controlling transmission of reference signals for mobility carried by beams for mobility in a wireless communications network, the method comprising the first access node: obtaining an identity of a plurality of reference signals for mobility associated with the first access node; determining an identity of a second beam for mobility associated with a second access node; the second beam for mobility being a neighbor beam for mobility to a first beam for mobility associated with the first access node; wherein the identity of the second beam for mobility is determined based on a neighbor relation between the second beam for mobility and the first beam for mobility; controlling transmission of the reference signals for mobility by transmitting, to the second access node, a request to transmit a reference signal for mobility comprised in the plurality of reference signals for mobility, on the second beam for mobility; wherein the request comprises: a respective identity of one or more reference signals for mobility comprised in the plurality of reference signals for mobility, which respective identity is based on the identity of the plurality of reference signals for mobility; and the identity of the second beam for mobility.

2. The method of claim 1, further comprising receiving, from the second access node, a confirmation message in response to the request; the confirmation message indicating that the second access node transmits one of the respectively identified one or more reference signals for mobility on the second beam for mobility.

3. The method of claim 1, further comprising: configuring a wireless communication device to receive the plurality of reference signals for mobility by transmitting the identity of the plurality of reference signals for mobility to the wireless communication device; and receiving a request for a mobility action from the wireless communication device; wherein the transmitting the request to transmit the reference signal for mobility on the second beam for mobility is performed in response to the received request for the mobility action.

4. The method of claim 1, wherein the request comprises a prioritization regarding which of the one or more reference signals for mobility to transmit on the second beam for mobility.

5. The method of claim 1, wherein an identity of a reference signal for mobility is based on when in time the reference signal for mobility is transmitted.

6. The method of claim 1, wherein the plurality of reference signals for mobility are unique within a coverage area of the first access node.

7. A first access node for controlling transmission of reference signals for mobility, carried by beams for mobility in a wireless communications network, the first access node comprising: processing circuitry; memory containing instructions executable by the processing circuitry whereby the first access node is operative to: obtain an identity of a plurality of reference signals for mobility associated with the first access node, determine an identity of a second beam for mobility associated with a second access node, which second beam for mobility is a neighbor beam for mobility to a first beam for mobility associated with the first access node, wherein the identity of the second beam for mobility is determined based on a neighbor relation between the second beam for mobility and the first beam for mobility; control the transmission of the reference signals for mobility by transmitting, to the second access node, a request to transmit a reference signal for mobility comprised in the plurality of reference signals for mobility, on the second beam for mobility; and wherein the request comprises: a respective identity of one or more reference signals for mobility comprised in the plurality of reference signals for mobility, which respective identity is based on the identity of the plurality of reference signals for mobility; and the identity of the second beam for mobility.

8. The first access node of claim 7, wherein the instructions are such that the first access node is operative to receive, from the second access node, a confirmation message in response to the request to transmit the reference signal for mobility on the second beam for mobility, the confirmation message indicating that the second access node transmits one of the respectively identified one or more reference signals for mobility on the second beam for mobility.

9. The first access node of claim 7, wherein the instructions are such that the first access node is operative to: configure a wireless communication device to receive the plurality of reference signals for mobility by transmitting the identity of the plurality of reference signals for mobility to the wireless communication device; and receive a request for a mobility action from the wireless communication device; in response to the received request for the mobility action, perform the transmitting the request to transmit the reference signal for mobility on the second beam for mobility.

10. The first access node of claim 7, wherein the request to transmit the reference signal for mobility comprises a prioritization regarding which of the one or more reference signals for mobility to transmit on the second beam for mobility.

11. The first access node of claim 7, wherein an identity of a reference signal for mobility is based on when in time the specific mobility reference signal is transmitted.

12. The first access node of claim 7, wherein the plurality of reference signals for mobility are unique within a coverage area of the first access node.

* * * * *